United States Patent
Renggli et al.

(10) Patent No.: US 9,921,591 B2
(45) Date of Patent: Mar. 20, 2018

(54) SYSTEM AND METHOD FOR HVAC INTERLOCKS

(71) Applicants: Franz Renggli, Buchrain (CH); Marcel Walti, Staufen (CH); William Thomas Pienta, Prospect Heights, IL (US); Virgil Seribo, Deerfield, IL (US); James J. Coogan, Des Plaines, IL (US)

(72) Inventors: Franz Renggli, Buchrain (CH); Marcel Walti, Staufen (CH); William Thomas Pienta, Prospect Heights, IL (US); Virgil Seribo, Deerfield, IL (US); James J. Coogan, Des Plaines, IL (US)

(73) Assignee: Siemens Schweiz AG, Zurich (CH)

( * ) Notice: Subject to any disclaimer, the term of this patent is extended or adjusted under 35 U.S.C. 154(b) by 1283 days.

(21) Appl. No.: 13/827,132

(22) Filed: Mar. 14, 2013

(65) Prior Publication Data
US 2013/0253709 A1 Sep. 26, 2013

Related U.S. Application Data

(60) Provisional application No. 61/615,696, filed on Mar. 26, 2012.

(51) Int. Cl.
| | | |
|---|---|---|
| G05D 23/00 | (2006.01) | |
| G05D 23/19 | (2006.01) | |
| G05B 15/00 | (2006.01) | |
| H04L 12/28 | (2006.01) | |

(52) U.S. Cl.
CPC ......... *G05D 23/1919* (2013.01); *G05B 15/00* (2013.01); *H04L 12/2821* (2013.01)

(58) Field of Classification Search
CPC . H04L 12/2821; G05B 15/00; G05D 23/1919
See application file for complete search history.

(56) References Cited

U.S. PATENT DOCUMENTS

| | | | | |
|---|---|---|---|---|
| 4,307,775 A | * | 12/1981 | Saunders | F16P 7/02 165/11.1 |
| 4,830,095 A | * | 5/1989 | Friend | F24F 3/044 165/208 |
| 4,990,245 A | * | 2/1991 | Wieme | B01J 49/85 137/624.18 |
| 5,361,215 A | * | 11/1994 | Tompkins | A61H 33/0095 236/12.12 |
| 5,471,849 A | * | 12/1995 | Bessler | F25D 17/065 165/205 |
| 5,870,317 A | * | 2/1999 | Barnett | G05B 23/0256 307/115 |
| 6,119,125 A | * | 9/2000 | Gloudeman | G06F 8/20 |
| 6,264,111 B1 | * | 7/2001 | Nicolson | F24F 11/006 236/49.3 |
| 6,272,578 B1 | * | 8/2001 | Jinkawa | G05B 19/056 710/110 |
| 6,516,041 B1 | * | 2/2003 | Curreri | G21D 3/001 340/517 |
| 2004/0251247 A1 | * | 12/2004 | Whipple, Jr. | F24C 7/087 219/395 |

(Continued)

*Primary Examiner* — Christopher E Everett

(57) ABSTRACT

An interlock function block system, method, and apparatus that reduces the necessity for a building automation programmer to program low-level instructions using a complex series of ANDs, ORs, and arithmetic functions to protect such devices is provided.

20 Claims, 17 Drawing Sheets

(56) References Cited

U.S. PATENT DOCUMENTS

| | | | | |
|---|---|---|---|---|
| 2004/0260431 A1* | 12/2004 | Keenan, Jr. | ............ | H04L 29/06 |
| | | | | 700/295 |
| 2005/0082277 A1* | 4/2005 | Jones | ................ | F24F 11/053 |
| | | | | 219/494 |
| 2005/0116543 A1* | 6/2005 | Merdjan | ............... | H02J 3/14 |
| | | | | 307/38 |
| 2006/0185373 A1* | 8/2006 | Butler | .............. | F24F 11/0009 |
| | | | | 62/181 |
| 2006/0243816 A1* | 11/2006 | Teti | ................ | F24D 19/1009 |
| | | | | 237/8 R |
| 2007/0167126 A1* | 7/2007 | Ghattas | ............. | F24F 3/161 |
| | | | | 454/187 |
| 2008/0047586 A1* | 2/2008 | Loldj | ................ | B01D 53/30 |
| | | | | 134/18 |
| 2008/0237217 A1* | 10/2008 | Helt | .................. | F24H 3/002 |
| | | | | 219/485 |
| 2009/0012652 A1* | 1/2009 | Nicholson | .......... | G05B 15/02 |
| | | | | 700/278 |
| 2009/0315485 A1* | 12/2009 | Verfuerth | ......... | H05B 37/0272 |
| | | | | 315/320 |
| 2010/0000118 A1* | 1/2010 | Cunningham | ........ | D06F 58/20 |
| | | | | 34/487 |
| 2010/0298982 A1* | 11/2010 | Chamorro | ......... | H01R 13/6456 |
| | | | | 700/276 |
| 2011/0278278 A1* | 11/2011 | Emerich | ........... | A47J 39/006 |
| | | | | 219/400 |
| 2013/0253709 A1* | 9/2013 | Renggli | ........... | H04L 12/2821 |
| | | | | 700/278 |

* cited by examiner

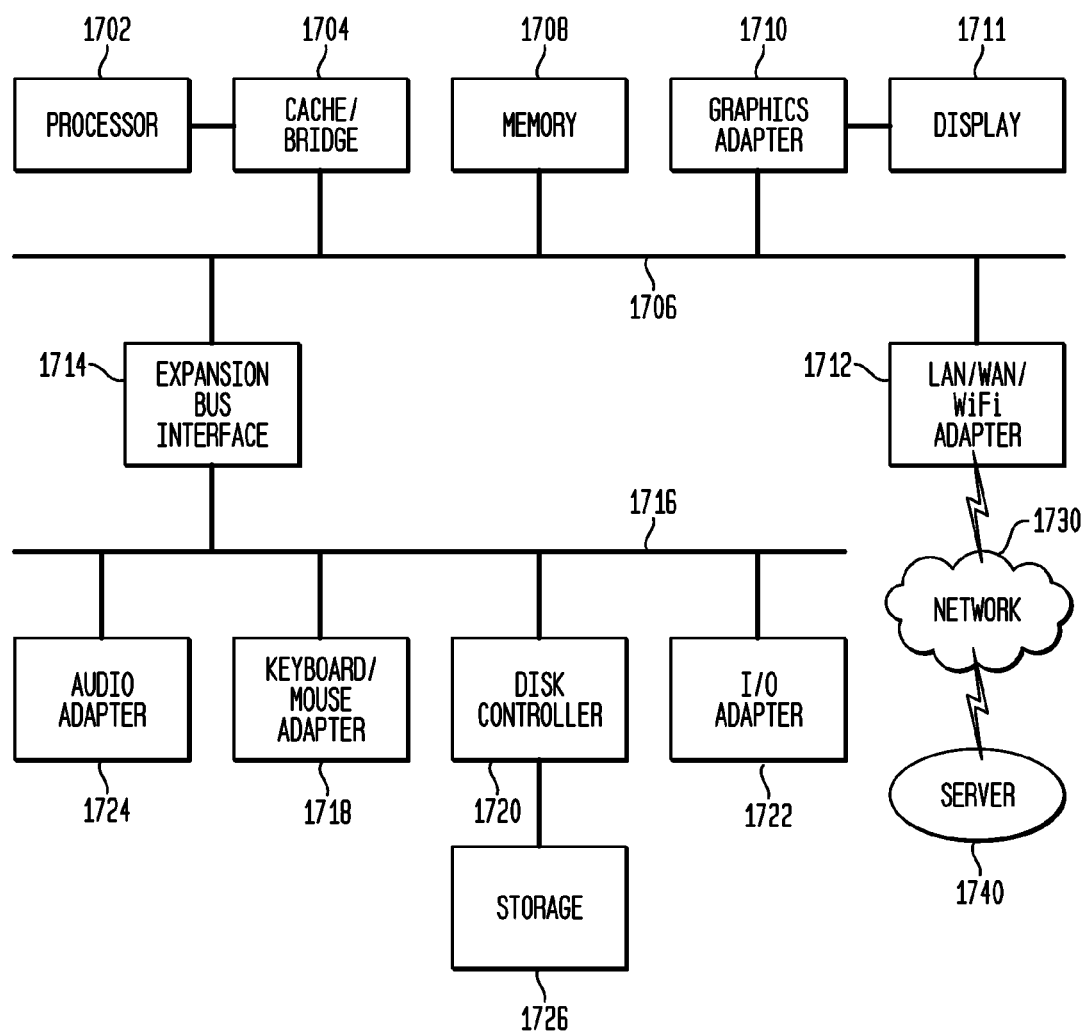

SYSTEM AND METHOD FOR HVAC INTERLOCKS

RELATED APPLICATION

This patent document claims priority under 35 U.S.C. § 119(e) and all other benefits from U.S. Provisional Patent Application No. 61/615,696, titled "SYSTEM AND METHOD FOR HVAC INTERLOCKS," filed Mar. 26, 2012, the content of which is hereby incorporated by reference to the extent permitted by law.

TECHNICAL FIELD

The present invention generally relates to building systems and, more particularly, to systems, processes, and methods for efficiently communicating with a plurality of HVAC devices.

BACKGROUND

A building automation system is an arrangement for monitoring, open-loop control and/or closed-loop control of process variables in complex technical systems in a building, or in a campus comprising a number of buildings. A building automation system typically operates heating, ventilation and air-conditioning systems, lighting and shading devices and also access control, security and fire surveillance systems. In the building automation system process variables—such as room air conditioning variables or events for example—are detected, evaluated, monitored, influenced or generated, with the energy consumption of the building or campus also advantageously being optimized by the building automation system.

Generally, a building automation system encompasses and operates a plurality of what are known as field devices, such as sensors and actuators. Examples of typical field devices are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. The building automation system typically comprises a plurality of software modules, processes or programs, and in general a number of computers or processors for their activation and also as a rule a plurality of open-loop and closed-loop control devices as well as further devices, for example devices for linking the building automation system to external communication networks, screens of devices for analysis of video signals.

The elements (HVAC physical objects or field devices) of a building automation system are widely dispersed throughout a facility. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building automation system operation, there is a need to monitor the operation of, and often communicate with, the various dispersed elements of a building automation system.

Electrical or wireless communication media are used in a building automation system for the exchange of data of individual devices or parts of systems, as a rule a number of communication networks exist, with cables, optical data communication channels, ultrasound connections, electromagnetic near fields or radio networks able to be used, including fiber optic networks or cellular networks for example. Examples of technologies or standards able to be used for the said data exchange are BACnet, LON or LonWorks® from the company ECHELON, the European Installation bus EIB, KONNEX, ZigBee or PROFIBUS defined by German standard DIN 19245.

Building automation systems typically have one or more centralized control stations in which data from each of the elements in the system may be monitored and in which various aspects of system operation may be controlled and/or monitored. The control station typically includes a computer having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the APOGEE® INSIGHT® Workstation, available from Siemens Industry, Inc. of Buffalo Grove, Ill., which may be used with the model APOGEE® building automation system, also available from Siemens Industry, Inc. (APOGEE and INSIGHT are U.S federally registered trademarks of Siemens Industry, Inc.) In this system, several control stations, connected via an Ethernet or another type of network, may be distributed throughout one or more building locations, each having the ability to monitor and control system operation. As a consequence, different people in different locations of the facility may monitor and control building operations.

The typical building automation system (including those utilizing the APOGEE® Insight® Workstation) has a plurality of field panels and/or controllers that are in communication with a workstation. In addition, the building automation system also includes one or more field devices connected to the field panels and/or controllers. Each field device is typically operative to measure, monitor, and/or control various building automation system parameters and/or functions. In particular, each field device may include one or more sensors and/or actuators to measure, monitor, and/or control corresponding "points" within the respective building and/or building automation system. As referenced herein, a "point" may be (i) any physical input or output to or from a respective controller, field device, sensor or actuator, or (ii) any virtual point associated with a control application or logic object within a controller or field panel that is measured, monitored or controlled. While the workstation is generally used to make modifications and/or changes to one or more of the various components of the building automation system, a field panel may also be operative to enable certain modifications and/or changes to one or more parameters of the system. This typically includes parameters such as a temperature set point or other set points in a field device controller or directly in a field device. In addition, the workstation may be configured to modify a control program or the like in a field panel for controlling a field device. In addition, a workstation may include a human interface into the system; a field panel may connect to field devices to run automatic programs that read data from input devices and execute commands to output devices.

Ensuring that related HVAC devices operate such that one device does not harm or cause an error with respect to another device is difficult and programming intense. Such programs typically make use of complex ANDs, ORs, and arithmetic functions to provide assurances that HVAC devices will not harm or operate counter to another device. Such device requirements are typically referred to as "interlocks." For example, a device may only fulfill its physical function if another device supports it in the case of a heating coil in a duct with a fan. Hot air will not be discharged from the heating coil unless the fan moves the air through the coil. Thus, the heating coil device must send a signal to the fan device requesting the fan to run. By way of another example, a device may cause damage if it runs without another in the case of a fan in a 100% outside air supply duct with an outside air damper. If the fan runs without first receiving a damper-open status signal, the duct on the inlet of the fan can collapse due to the unrelieved suction. Another example includes that two devices can cause damage if they operate together. Still other examples include a time delay that should be included with an interlock such as in the case of an electric heating coil that continues to send a hold request for air flow to the fan for five minutes after the heating coil turns off to dissipate residual heat in the coil. Still other examples include when two similar devices share load and run-time (Lead-Lag control) requiring coordinated control of lead-lag between the lead device and the lag device.

BRIEF SUMMARY

In a first aspect, a method for applying interlock assurances for a plurality of building automation devices is provided. The method includes providing a first interlock block logically connected to a supported building automation device and a supporting building automation device; the first interlock block including: an input status module for receiving an input from the supporting building automation device; an output status module for sending an output to the supported building automation devices; and means for determining whether the supporting building automation device is configured to support the supported building automation device; receiving a demand request from the supported building automation device; and determining whether the supporting building automation device is configured to support the supported building automation device.

In a second aspect, a system for assuring that a supported building automation device has adequate support from a supporting building automation device is provided. The system includes an interlock block logically connected to a supported building automation device and a supporting building automation device, wherein the interlock block includes: an input status module for receiving one or more inputs from one or more building automation devices; an output status module for sending outputs to one or more building automation devices; and means for determining whether a supporting building automation device is configured to support a supported building automation device.

In a third aspect, a computer readable storage medium having stored therein data representing instructions executable by a programmed processor for controlling a supported building automation device is provided. The storage medium includes instructions for: providing an interlock block logically connected to a supported building automation device and a supporting building automation device; the interlock block including: an input status module for receiving inputs from a first building automation device; an output status module for sending outputs to a second building automation device; and determining whether the supporting building automation device is configured to support the supported building automation device; receiving a demand request from the supported building automation device; and determining whether the supporting building automation device is presently configured to support the supported building automation device.

BRIEF DESCRIPTION OF THE SEVERAL VIEWS OF THE DRAWINGS

The embodiments will be further described in connection with the attached drawing figures. It is intended that the drawings included as a part of this specification be illustrative of the exemplary embodiments and should in no way be considered as a limitation on the scope of the invention. Indeed, the present disclosure specifically contemplates other embodiments not illustrated but intended to be included in the claims. Moreover, it is understood that the figures are not necessarily drawn to scale.

FIG. 17 illustrates a block diagram of a data processing system in which an embodiment can be implemented, for example, as an interlock data processing system particularly configured by software or otherwise to perform the processes as described herein

DETAILED DESCRIPTION OF PRESENTLY PREFERRED EMBODIMENTS

Figure 1:
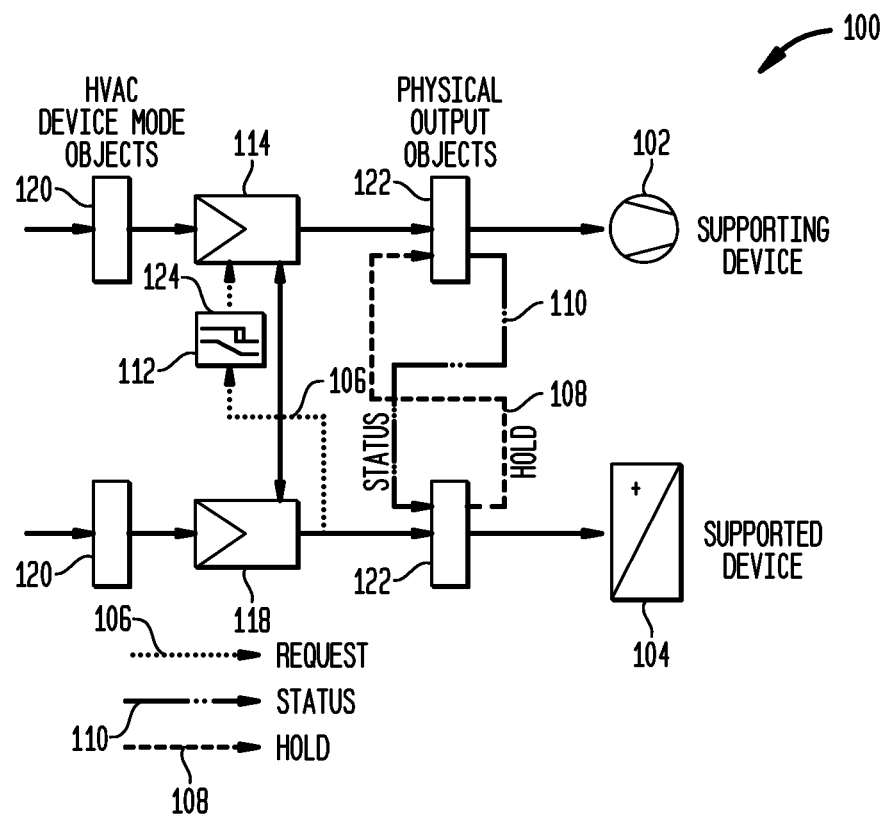
FIG. 1 illustrates an interlock interface.

The exemplary embodiments provided are illustrative. The present invention is not limited to those embodiments described herein, but rather, the disclosure includes all equivalents. The systems, processes, and methods can be used in any field benefiting from interlocks.

Unless otherwise defined, all technical and scientific terms used herein have the same meaning as commonly understood by one of ordinary skill in the art. In case of conflict, the present document, including definitions, will control. Preferred methods and materials are described below, although apparatuses, methods, and materials similar or equivalent to those described herein can be used in practice or testing. All publications, patent applications, patents and other references cited herein are incorporated by reference in their entirety to the extent permitted by law. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

A more detailed description of the embodiments will now be given with reference to FIGS. 1-17. Throughout the disclosure, like reference numerals and letters refer to like elements. The present disclosure is not limited to the embodiments illustrated; to the contrary, the present disclosure specifically contemplates other embodiments not illustrated but intended to be included in the claims.

Because ensuring that related HVAC devices operate such that one device does not harm or cause an error with respect to another device is difficult and program-intense, what is needed is a function block system and method that reduces the necessity for a building automation programmer to custom program low-level instructions using a complex series of ANDs, ORs, and arithmetic functions to protect such devices. Such an innovative system and method of HVAC interlocks would make the installation of HVAC devices in the building automation model more efficient and less likely to cause harm/error to it or another device when operating/not operating. Additional advantages and benefits will be apparent.

For example, as described herein, a building automation device and/or the building automation model may include processing circuitry/logic configured to access and execute a control program that is stored in memory (such as random access memory, cache memory or other volatile memory storage device or computer readable media) or secondary storage (such as read only memory, non-volatile flash memory, hard drive, memory stick or other non-volatile memory storage device or computer readable media) to provide for a system or method of interlocks to prevent errors or damage to one or more HVAC devices dependent, reliant, or logically connected to one or more other HVAC devices. The control program may be a separate program or a program module of building automation device. The control program may include an operating system (such as Linux or other conventional operating system). The control program instructs and interacts with HVAC devices to provide efficient interlock functionality with reduced efforts from a human programmer.

Some interactions between HVAC device components are supported as interlocks and some are supported by the sequencing of feedback controllers. Sequencing of feedback controllers (through signals like "from higher," "to lower," etc.) generally applies when one device stops doing the job of controlling a variable, and passes the control task to another device. In contrast, if a device calls for support from another to control the variable or provides support to another to control the variable, those interactions are implemented with interlock functions. The systems and methods illustrated herein and equivalents thereto are illustratively applied to interlocks but may also be applied to sequencing.

Likewise, supply chain connections may also benefit from the systems and methods illustrated herein and equivalents thereto, including but not limited to complex coordination of multiple devices combining to meet a variable load. For example, a hot water system with several boilers may utilize a mixing valve to control the supply water temperature. The mixing valve component may demand support from the boiler component(s) and use information about the number of active boilers to alter the operation of the mixing valve.

By contrast, logic used to protect equipment from damage that does not involve external HVAC device components typically is not addressed by interlocks but instead is handled by safety logic within the HVAC device component to be protected. Examples include a heat pump compressor and reversing valve coordination handled as one aggregate with internal safeties; and a hot water boiler, circulating pump, and isolation valve handled as one aggregate with internal safeties. However, such logic may benefit from, or contribute to, the systems and methods illustrated herein and equivalents thereto. For example, a signal from an over-temperature switch within an electric heating coil device component could be part of the logic to determine the demand for air flow from the supporting device.

1. Interlock Interface

FIG. 1 illustrates an interlock interface 100. A set of signals and processes has been developed for interlocking HVAC devices. It facilitates at least the following functions:

operate a supporting HVAC device (at the level necessary) to support the process of another device. (example: a fan 102 supports an electric heating coil 104); Throughout, this patent document, supported device may become the supporting device and visa versa—such as in the case of fan 102 could be supported by a damper.

operate a supporting device 102 at a priority that appropriately protects the supported device 104 (wherein signals may have priority levels such that if two commands of different values go to the same input, the value with the higher priority will be used); and block (with a command at an appropriate priority) operation of a supported device 104 when the lack of support can cause damage (for example, lack of air flow across an electric heating coil can cause the heating elements to fuse, destroying the coil and possibly starting a fire).

Many HVAC applications include special features designed to prevent damage to equipment. The required response typically fits one of the following descriptions:

within one device component;

multiple devices through interlock function; and whole plant by setting HVAC Plant Mode.

All these types of responses occur in HVAC Control Programs. Specifications for individual applications indicate the type of response for each particular hazard.

Room HVAC applications apply the interlock as appropriate to accomplish the required functions. Some applications require only part of the interlock function. The HVAC device components for these applications support the full set of interlock signals.

Interlock Signal: Request.

Controller 118 controls the position of the supported device 104 (e.g., a heating coil valve actuator position) based on control variables (such as the temperature and the temperature set point.) A request signal 106 indicates the level of output or intended output (analog percentage; other data types are contemplated) from the controller 118 of the supported device 104. As is illustrated, HVAC device mode objects 120 provide mode data to controllers (also referred to as control loop devices or proportional-integral-derivative controllers ("PID")) 114, 118 directing them to implement specific modes (such as two position action, full closed, full open or modulating action in the case of a heating coil valve.) The controller's output values are passed to physical output objects 122. The values possessed by the physical output objects are provided to 102 (supporting device) and 104 (supported device) respectively, as illustrated. If the controller 118 for the supported device 104 outputs a demand (also called a request), as indicated by signal 106, but is blocked from operating by the interlock function, then signal 106 indicates the demand, not the actual output of supported device 104. If the supporting device 102 is a staged or binary device, such as a multiple speed or single speed fan, the demand can still be indicated by a percentage to make it possible to interchange devices without altering interfaces. To do this, the request signal 106 is sent and converted from an analog single to a Boolean on/off signal 124 by converter 112 to enable controller 114 which can then start or stop supporting device 102 as needed. If the supporting device 102 is modulating, its controller 114 determines the level of support appropriate for the level of request signal 106 from the supported device's controller 118.

Interlock Signal: Hold.

The hold signal 108 (binary; other data types are contemplated) indicates that the supported device 104 is already operating or was recently operating and still needs support. The interlock logic of the supporting device 102 will respond at a higher priority when the hold signal 108 is true. This means the need for support is critical and disabling the supporting device 102 is no longer an option.

Interlock Signal: Status.

The status signal 110 (binary; other data types are contemplated) indicates the supporting device 102 is running in a way that sufficiently supports the supported device 104. If necessary, the interlock logic of the supported device 104 uses this status signal 110 to prevent operation of the supported device 104 when support is not available. To implement such a blocking function, the status signal 110 generates a high priority "off" command to the output object in the supported device 104.

2. Interlock Block Used for Supply Chain

Figure 2:
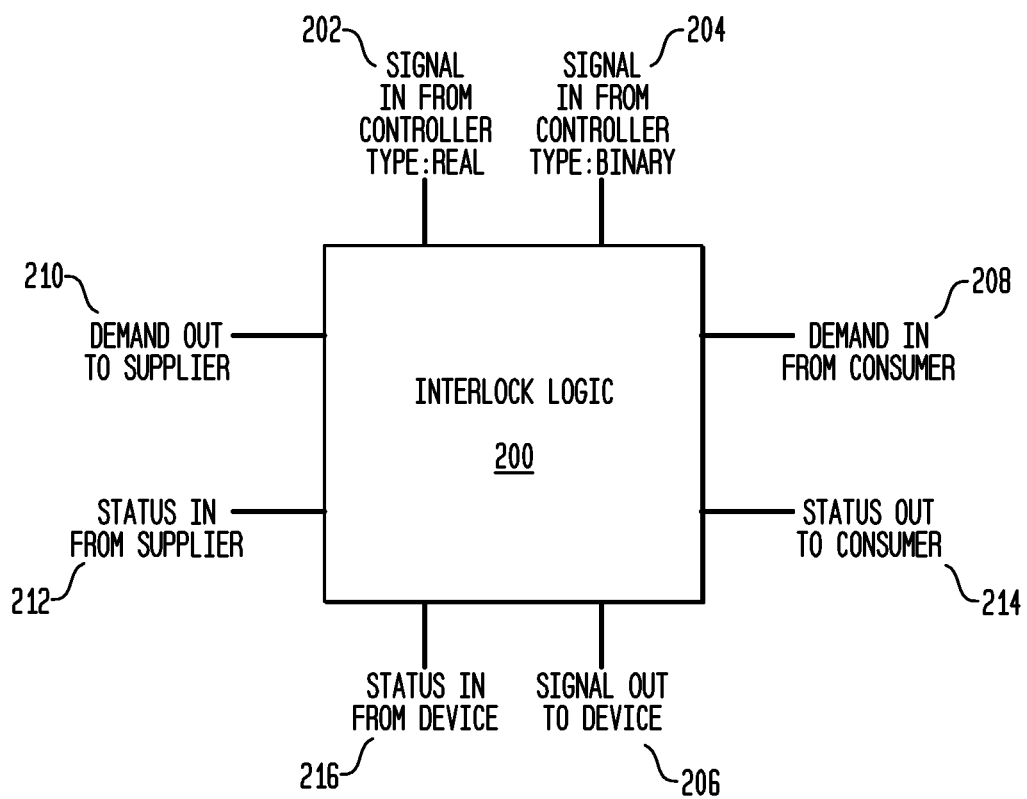
FIG. 2 illustrates an interlock block used in supply chain logic.

FIG. 2 illustrates an interlock block 200 used in supply chain logic. Referring to FIG. 2, this block 200 can be inserted within an HVAC device component or implemented external to the HVAC device component.

Signal Descriptions

Signal in from Controller 202—Type Real

The signal in from controller signal 202 is the analog (Data Type: Real) control signal from the controller for this HVAC device. It is expected, although not required, that this signal 202 will have a priority level (Data Type: Multistate [integer]) associated with it to prevent this control signal 202 from being overridden by a lower priority signal.

Signal in from Controller 204—Type: Binary

The signal in from controller 204 is a binary signal (other data types are contemplated) from the controller. This signal 204 can be the actual control signal to the HVAC device, if the device operates in a binary fashion. If the HVAC device is analog, then this signal 204 is a binary representation of the status of the analog signal. A TRUE state means that there is a call for the medium supplied by this HVAC device; a FALSE indicates no call for this medium.

If the HVAC is analog (and there exists a signal 202), it is expected, although not required, that the priority (Data Type: Multistate) of this signal 204 comes from the same source as the priority for the Signal In From Controller—Type: Real 202, so both will have the same priority.

It is preferred that the controller for this HVAC device provides this binary output 204 in addition to an analog output 202. If not, a threshold switch with hysteresis (converter) 112 (illustrated in FIG. 1) may be included either within or outside of this interlock block 200 to generate the binary signal from the analog signal 202.

Signal Out to Device 206

The Signal Out To Device signal 206 is the command to the HVAC output device and is the value of the Signal In From Controller 204 (binary) or 202 (real) if the Status In From Supplier (supporting device) 212 is TRUE. If FALSE, the output to the HVAC device goes to zero or some other predefined value representing that the device should disengage. The priority (Data Type: Multistate) of this signal 206 is preferably the same as the priority of the Signal In From Controller 204 or 202.

Demand in from Consumer 208

The Demand In From Consumer (supported device) 208 can be real, multistate (integer) or binary. This signal 208 comes from the Demand Out To Supplier signal 210 of the interlock logic of the consumer (supported device) in the supply chain. This signal has a priority value (Data Type: Multistate).

Demand Out to Supplier 210

If binary, the Demand Out To Supplier signal 210 represents the output of a Boolean OR of the Demand In From Consumer (supported device) signal 208, OR the proof status of the HVAC device (Status In From Device 216), OR Signal In From Control Type: Binary 2040R signal in from controller Control Type Real 202 converted to a binary by using a converter (threshold switch) 112.

If real, this signal 210 represents the greater of the Signal In From Controller (Data Type: Real) 202, the Demand In From Consumer (supported device) signal 208, or the Status In From Device (Data Type: Real) signal 216.

The priority of the Demand Out To Supplier (Data Type: Multistate) signal 210 represents the greater of the priority of the Signal In From Controller (202 or 204) or priority of the Demand In From Consumer signal 208.

Status in from Supplier 212

The Status In From Supplier (supporting device) signal 212 comes from the Status Out To Consumer (supported device) signal 214 of the Supplier's interlock block. Signal 212 is a binary signal (other data types are contemplated).

Status Out to Consumer 214

The Status Out To Consumer (supported device) signal 214 is the output of the supporting device's interlock logic This signal 214 is the output of a Boolean AND of all of the following:

Status In From Device signal 216

Status In From Supplier (device that supports the supporting device, if applicable) signal 212.

a Boolean TRUE from either the Demand In From Consumer (supported device) 2080R Signal In From Control Type: Binary 2040R signal in from Control Type Real 202 converted to a binary by using a converter (threshold switch) 112.

Status in from Device 216

The Status In From Device signal 216 is the HVAC device's proof of operation signal. It can be a binary or analog signal. The various physical sources of this signal 216 can have varying degrees of certainty that the controlled medium is actually in the state represented by this signal 216. For example, air flow status can come from an auxiliary contact on the fan relay, a current sensor on the fan motor wiring, or an air flow sensor—the latter being the truest indication of air flow.

3. Definitions, Acronyms and Abbreviations, Conventions

| Term | Description |
| --- | --- |
| interlock | A connection between HVAC device components to prevent damage to a component or the system or coordinate the support one device must give another in order to perform its function. |
| demand/request | A signal from a consumer or supported device to a supplier or supporting device requesting that the supplier activate its process so that the consumer's process can be activated effectively and safely. The demand (or request) signal can be analog, binary or multistate and used in an interlock mechanism or a supply chain mechanism. |
| status | A signal that indicates the state of a HVAC device component. |
| limitation | A signal from a supplier to a consumer indicating how much of the supplier's controlled medium can be delivered to the consumer. This signal is likely to be analog and used in the supply chain mechanism. |

4. Illustrative Programming Pattern for HVAC Interlocks 4.1 Design Objectives and Decision Criteria 4.1.1 Effective Partitioning of Functions for Library of Components One goal is to create a function block embodiment that reduces the necessity for the software programmer to program on a low level (using ANDs, ORs, arithmetic functions, etc.). As set forth below, the embodiments may include the following objectives and criteria to enhance it, although none are required:

HVAC device components may be the library elements.
Components may be selected and applied independently of each other.

4.1.2 Simple Editing Tasks at Plant Level

Embodiments may support the goal of assembling building control applications by simply removing and replacing components and not having to do low level programming. The embodiments may support easy interchangeability of components with similar function (e.g. replace modulating device with 2-position device). Signals may be named consistently for easy connection manually and "automatically" within a programming tool.

4.1.3 Consistency with BACnet

The embodiments may support use of BACnet signaling and commanding concepts (priority and priority array) in addition to other standards.

4.2 Types of Interlock Functions Required

There is a wide variety of examples. The most common, by far is the heating and cooling devices that depend on air flow.

4.2.1 Examples of Types of Interlock Relationships Between Components 4.2.1.1 A Device can Only Fulfill its Physical Function if Another Supports it A heating coil in a duct with a fan is an example of this type of interlock. Hot air will not be discharged from the heating coil unless the fan moves the air through the coil. The heating coil device must send a signal to the fan device requesting the fan to run. Also considered are interlocks including varying levels of requirement and support. For example, if the airflow through a heating coil needs to be proportional to the heating valve position, a multistate or an analog request signal to the fan device from the heating coil device is implemented.

4.2.1.2 A Device can Cause Damage if it Runs without Another

A fan in a 100% outside air supply duct with an outside air damper is an example of this type of interlock. If the fan runs without first receiving a damper-open status signal, the duct on the inlet of the fan can collapse due to the unrelieved suction.

4.2.1.3 Two Devices can Cause Damage if they Operate Together

Damage can be caused if two devices run together. An example of this might be interlocking two heat pump compressor enable signals (not interlocked internally in the heat pump), one for heating and the other for cooling, to prevent damage to the compressor.

4.2.1.4 A Time Delay should be Included with an Interlock

An electric heating coil that continues to send a request for air flow to the fan for 5 minutes after the heating coil turns off is an example of this interlock relationship.

4.2.1.5 Two Similar Devices Share Load and Run-Time (Lead-Lag Control)

Lead-lag control may be coordinated using interlocks between the lead device and the lag device, and/or both devices may be in one HVAC device component. An example of lead-lag control might be the alternating operation of two compressors to even out the wear on the compressors over their lifetime.

Figure 3:
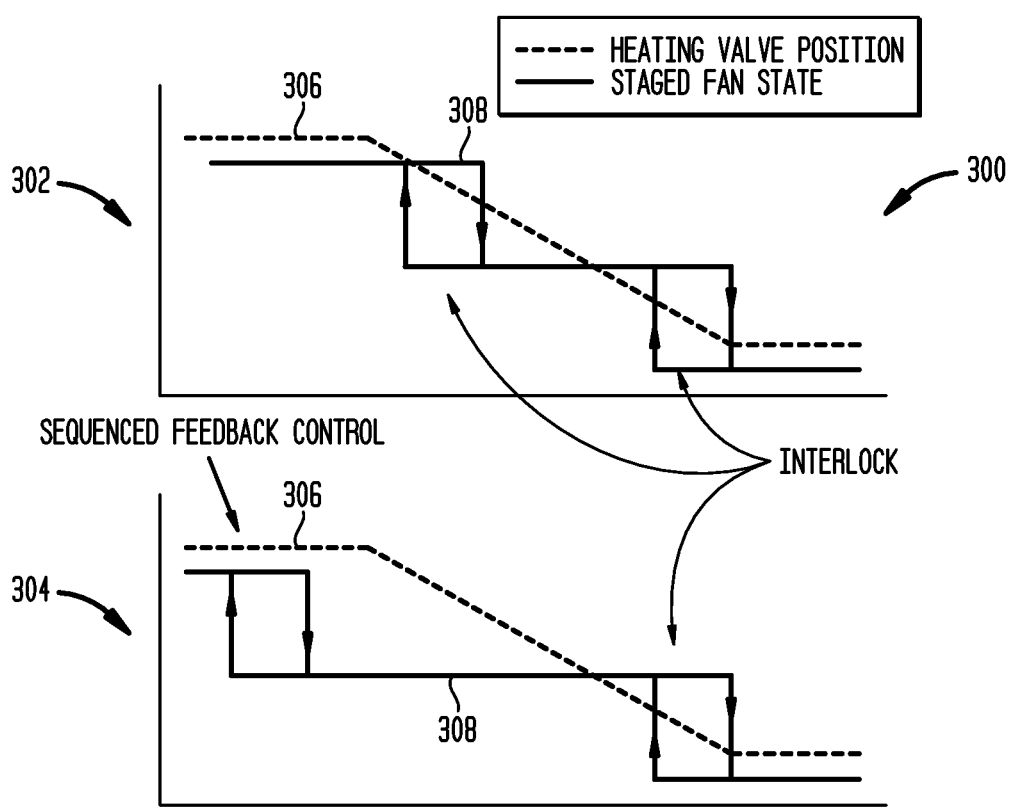
FIG. 3 illustrates interlocking and sequencing.

4.2.2 Distinguishing Interlock from Other Component Interactions 4.2.2.1 Interlock Vs. Sequencing FIG. 3 illustrates interlocking and sequencing 300. Some interactions between HVAC device components are supported as interlocks and some are supported by the sequencing of feedback controllers. Application designers need to choose the appropriate mechanism to implement the required behavior. Sequencing of feedback controllers (through a scheme that passes a "token" signal between feedback controllers that are "higher" in the sequence order and those that are "lower" in the sequence order) applies when one device stops doing the job of controlling a variable, and passes the control task to another device. In contrast, if a device continues to control the variable, but calls for support from another, then that interaction is implemented with interlock functions.

Referring to FIG. 3, two slightly different fan coil sequences illustrate the difference. Each graph 302, 304 illustrates the response of a heating coil valve and fan (up is open or ON; down is closed or OFF) with changing measured temperature (left is low temperature; right is high temperature). Graph 302 illustrates two fans or fan speeds staged (switched) within the control range of the heating valve position as the valve is modulated open and closed. Fan operation is illustrated by line 308; heating valve operation is illustrated by line 306. Both fan stages are interlocked with the heating valve such that the valve requests (demands) fan operation and must receive fan ON status before the valve can open. Graph 304 illustrates the second stage of the fan sequenced with the heating valve. The heating valve must be in the fully open position before the second fan stage can turn ON. Implementation of the functions in FIG. 3 might result in using interlocks to do sequencing or visa-versa. For example, if the start and stop threshold values for the upper left fan hysteresis control can be set to values large enough, the fan can operate like the Sequenced Feedback Controller in graph 304.

4.2.2.2 Distinguish/Compare to Supply Chain Connections

There are more complex examples of multiple devices that are interlocked to send a variable load signal up or down the supply chain. For example, a hot water system with several boilers uses a mixing valve to control the supply water temperature: the mixing valve component demands support from the boiler component(s), and uses information about the number of active boilers to alter the operation of the mixing valve. The interlock function may be implemented to improve coordination between the mixing valve and boiler operation and protect the boilers with proper valve and water flow operation.

4.2.2.3 Distinguish from Safeties Implemented within an Aggregated HVAC Device Component.

Logic to protect equipment from damage that does not involve external HVAC device components preferably is not handled by interlocks but instead is handled by safety logic within the HVAC device component to be protected. However, it could be handled by the exemplary interlock embodiments provided herein and equivalents thereto.

EXAMPLES

Heat pump compressor and reversing valve coordination should be handled as one aggregate with internal safeties; although the exemplary interlock embodiments provided herein and equivalents thereto could be utilized.

Hot water boiler, circulating pump, and isolation valve should be handled as one aggregate with internal safeties; although the exemplary interlock embodiments provided herein and equivalents thereto could be utilized.

4.2.2.4 Interlock Method is Compatible with Mode Selection

Mode signals from the mode determination block also serve to coordinate the operation of the HVAC device components. Unlike interlock signals, which can go in or out of a device component, mode signals typically only go into the device components. Mode signals are commands to the device components rather than communications between device components. Typically, no signals are passed from the device component to the mode determination block.

For example, in a constant volume 100% outside air air handling unit ("AHU"), the mode determination block might send an occupied signal to all device components, but it is up to the interlocks to prevent the fan from turning on until the damper is open. The damper status interlock signal from the damper end switch is sent to the fan device component. Although the mode determination block could send a delayed occupied signal to the fan to allow the damper time to open, this method is not as certain as utilizing the damper status interlock signal.

In an example of another embodiment in which each device has its own mode determination block, an over-temperature switch in an electric heating coil device component might be programmed to pass an OFF signal to its mode determination block to turn off the electric heating coil at a high, equipment protection priority level to prevent other programs and/or users from turning the electric heating coil ON.

4.3 Standard Interlock Block

This section illustrates embodiments of an interlock block that can be used within any HVAC component. Interlocks may be packaged separately or integral into a larger package. Thus, the term "block" does not require that the interlock be a separate module.

4.3.1 Standard Signals

This section illustrates exemplary input and output signals to the interlock logic block, their names, their functions, and which ones carry priority.

Figure 4:
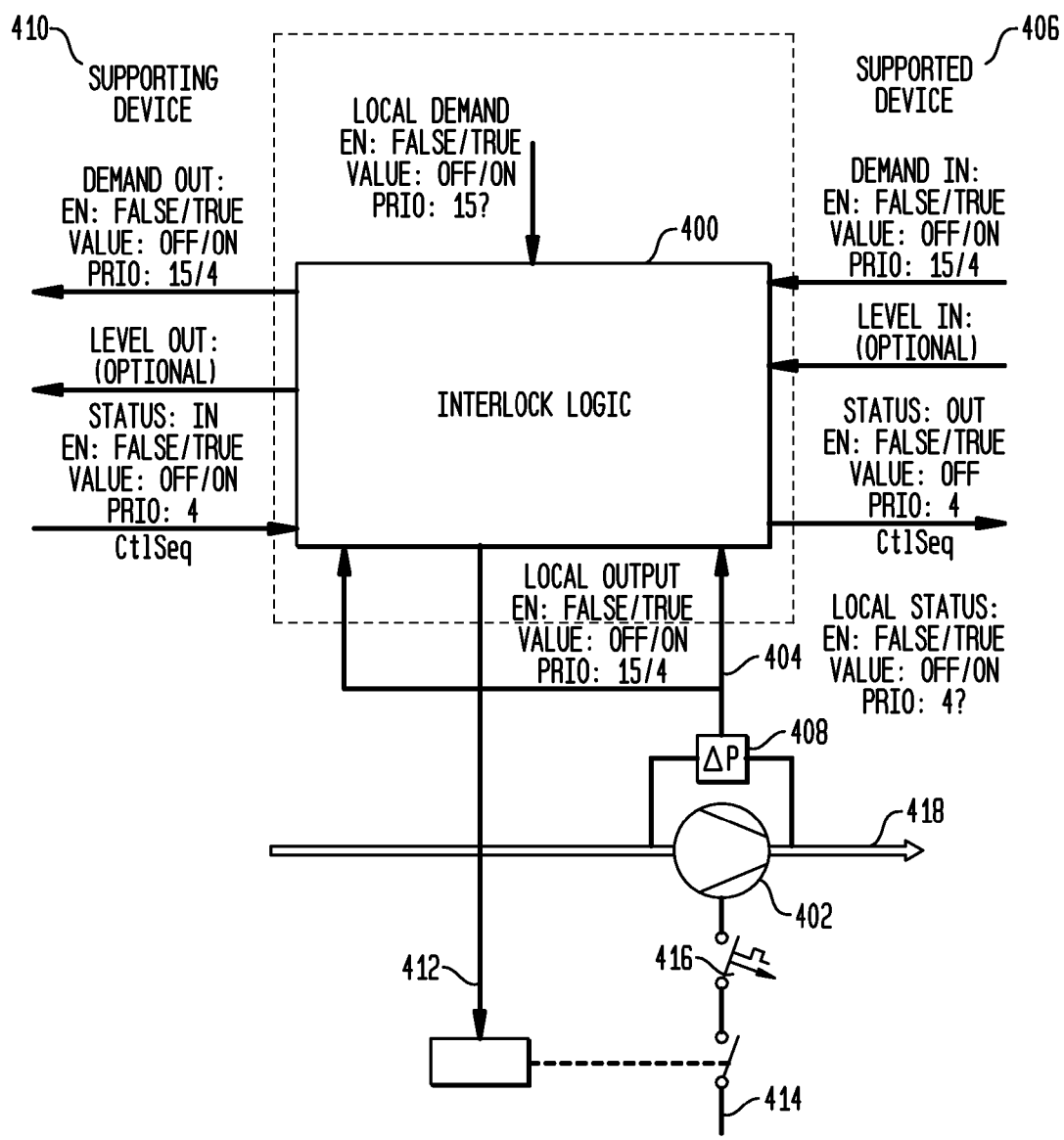
FIG. 4 illustrates an interlock block.

FIG. 4 illustrates an interlock block 400. The following describes the input and output signals in detail.

| Signal | Priority | Enable | Type | To/From |
|---|---|---|---|---|
| Demand or Hold in | X | X | Binary | from supported device |
| Request or Level in (optional) | | | same as out device | from supported device |
| Status out | X | X | Binary | to supported device |
| Local Demand | X | X | same as out device | from within device component |
| Local output | X | X | same as out device | out to device |
| Local status | X | X | Binary | from h/w status or calculated |
| Demand out | X | X | Binary or integer | to supporting device |
| Request or Level out (optional) | | | same as out device | to supporting device |
| Status or Hold in | X | X | Binary | from supporting device |

Priority ("prio") is applied to some signals to prevent the value of the signal from being changed by lower priority commands. For example, (1) Local Status 404 from fan 402 airflow sensor 408 to a supported device 406, such as an electric heating coil, may be at a high priority to prevent damaging over-heating of the coil if a low priority command turns off the fan 402 and stops air flow through duct 418; (2) the Status In from the supporting device 410, such as a damper to allow fan 402 operation, may be at a high priority because knowledge of the air path has shown that the possibility of duct 418 damage exists if the damper is commanded closed while the fan 402 is running. As is further illustrated in FIG. 4, fan relay 412 turns on (or off) electrical switch 414 to make (or break) the electrical path through the circuit breaker 416 to turn on (or off) fan 402. Alternatively, rather than supported device 406 providing an analog value, supported device 406 can provide a "level in" digital value. Similarly, the supporting device 410 can receive a digital "level out" value as opposed to an analog value.

4.3.2 Illustrative Implementations

This section illustrates exemplary implementations of the interlock block embodiments for a constant volume 100% outside air AHU with electric heat.

Figure 5:
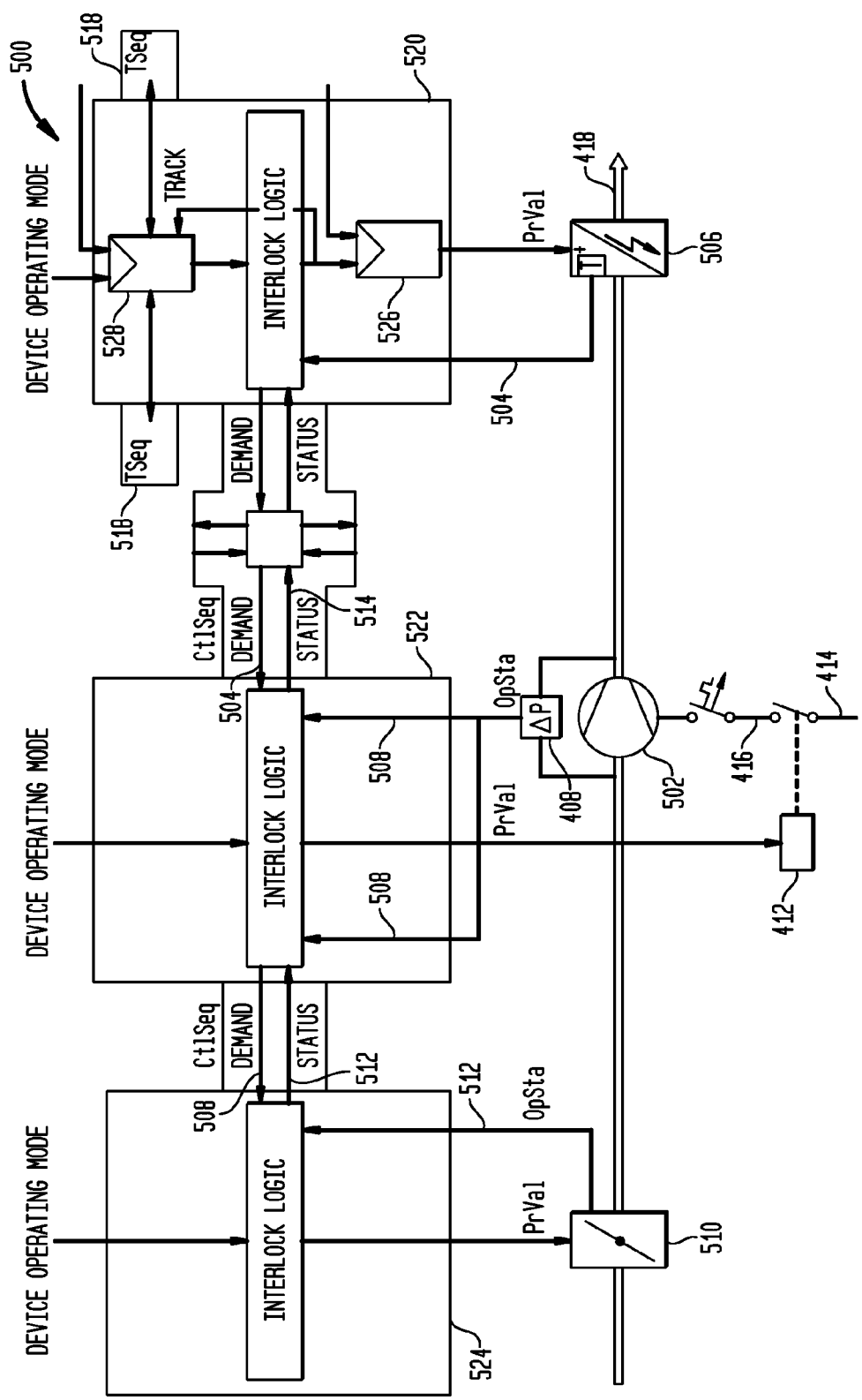
FIG. 5 illustrates an interlock scenario.

FIG. 5 illustrates an interlock scenario 500 without showing or discussing the interlock detail within each device component. Interlock scenario is that, on a call for heat from temperature controller 528, the electric heating device component 520 sends a request/demand 504 to the fan device component 522 for airflow. The fan device component 522 sends a request/demand 508 to the outside air damper device component 524 to open the damper 510 (to prevent sucking in the duct). When the damper 510 opens air indicated by its status (OpSta) 512, the damper device component 524 sends a status signal 512 to the fan device component 522 to start the fan 502, and the fan 502 starts. Airflow is sensed by differential pressure sensor 408 and indicated by status signal (OpSta) 508. The fan device component 522 sends an on status signal 514 to the electric heating coil device component 520 thus allowing the controller 526 to energize the electric heating coil 506. Thus, in this exemplary embodiment illustrated in FIG. 5, electric heading coil 506 should not operate if fan 502 is not operating, to prevent exceeding electric heating coil 506 temperature restrictions; nor should fan 502 draw air if damper 510 is closed. Thus, the interlock logic in the device components 524, 522, and 520 of devices 510, 502 and 506 ensure that the devices (510, 502, 506) are operating only when the situation is ideal for each device. TSeq 518 represents the temperature sequence linker and enables sequencing the operation of heating coil temperature control loop device 528 with other temperature control loop devices, such as a cooling coil controller. "PrVal" is an abbreviation for present value; "OpSta" is an abbreviation for operation status; and "CtlSeq" is an abbreviation for control sequence linker. The Control Sequencer can send supply chain demand signals and receive supply chain status signals. In the case of an electric powered heating coil, these signal might be part of various electrical energy conserving programs such as demand response or peak limiting.

Figure 6:
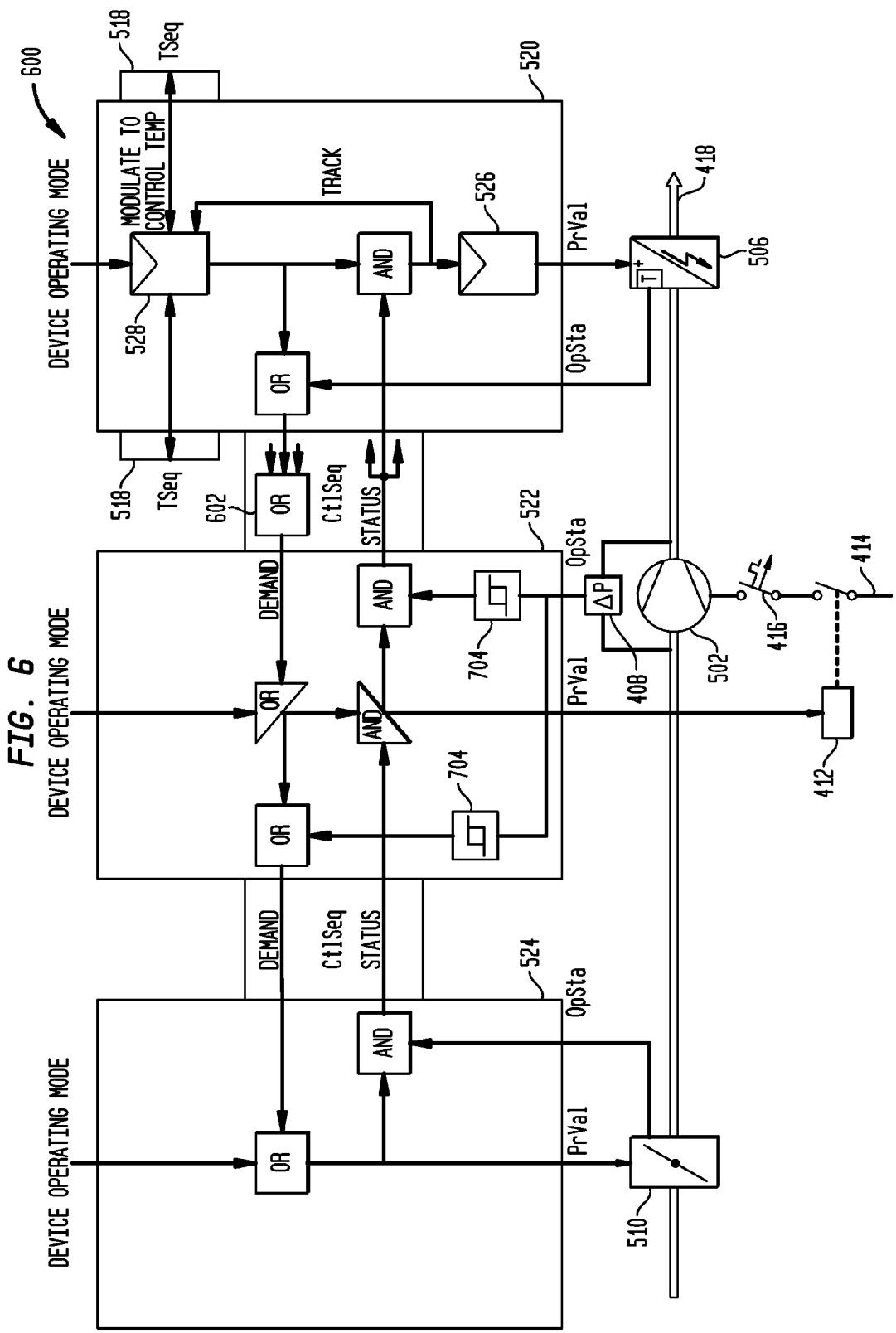
FIG. 6 illustrates an example of the interlock scenario implemented wherein the demand and the status signals are both binary.

4.3.2.1 Binary Version:

Enhancing the detail of FIG. 5, FIG. 6 illustrates an example of the interlock scenario 600 implemented wherein the demand and the status signals are both binary. It is anticipated that some functions (timers, level comparator) may be added to the interlock logic in the device components (520, 522, 524), although it is not required. In this example, an OR statement is inside of a control sequence linker (CtlSeq) 602, but the OR statement may be outside of the CtlSeq. Also in this example, are two converters 704 to convert an analog signal to digital by changing the state of its digital output when the analog input value from the differential pressure airflow sensor 408 reaches a certain threshold value. When the analog value from the differential pressure airflow sensor 408 rises to the threshold value, the converter 704 turns the output signal on. When the analog value falls below the threshold value (minus a hysteresis value), the converter 704 turns the output signal off. In the embodiment illustrated, hysteresis is utilized to address chatter at or near the threshold. Other embodiments might use a time delay or other methods.

Since the demand signal is governed by priority, the operation of each OR statement is as follows:

1. If the input signals have different priority, the signal with the higher priority is outputted.

2. If the signals have equal priority, standard Boolean logic determines the output.

4.3.2.2 Analog Version

Figure 7:
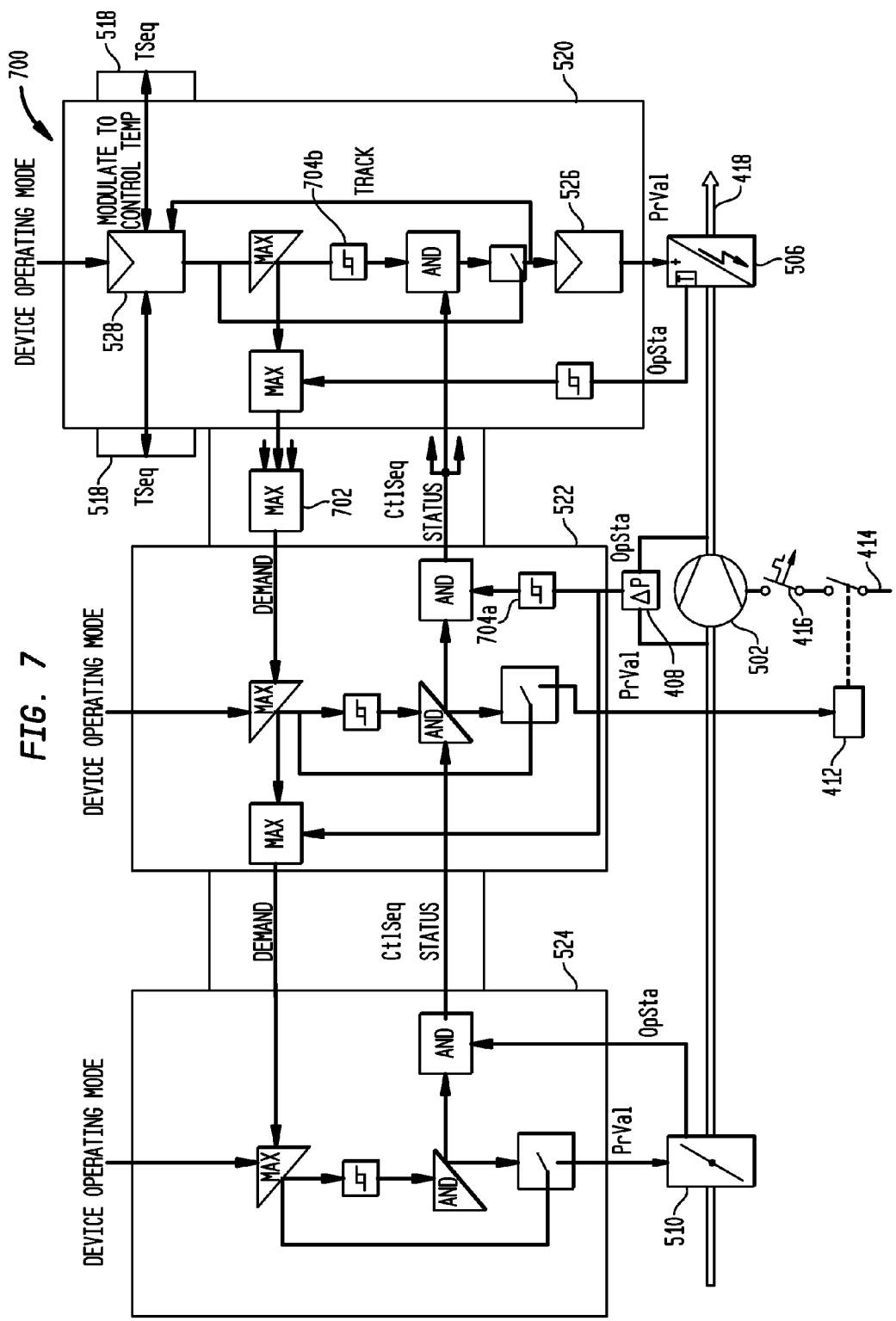
FIG. 7 illustrates an analog implementation using Max statements rather than Boolean ORs so that analog demand signals can be compared.

Enhancing the detail of FIG. 5, FIG. 7 illustrates an analog implementation 700 of the interlock scenario using Max statements rather than Boolean ORs so that analog demand signals can be compared in the device components (520, 522, 524) and in the control sequence linker 702. Although not required, a MAX statement could also be used outside of the control sequence linker 702 to handle multiple electric heating coils. As illustrated, converter 704b converts an analog signal to digital by changing the state of its digital output when the analog input value from controller 520 reaches a certain threshold value. When the analog value rises to the threshold value, the device turns the output signal on. When the analog value falls below the threshold value (minus a hysteresis value), the device turns the output signal off. In the embodiment illustrated, hysteresis is utilized to address chatter at or near the threshold. Other embodiments might use a time delay or other methods.

Also in this example is another use of converter 704a to convert an analog signal to digital by changing the state of its digital output when the analog input value from the differential pressure airflow sensor 408 reaches a certain threshold value. When the analog value from the differential pressure airflow sensor 408 rises to the threshold value, the converter 704a turns the output signal on. When the analog value falls below the threshold value (minus a hysteresis value), the converter 704a turns the output signal off. In the embodiment illustrated, hysteresis is utilized to address chatter at or near the threshold. Other embodiments might use a time delay or other methods.

Since the demand signal is governed by priority, the operation of each MAX statement is as follows:

1. If the input signals have different priority, the signal with the higher priority is outputted.

2. If the signals have equal priority, the larger value signal is outputted.

4.3.3 General Rules for Locating Calculations

Interlocks will at times benefit from calculations or logical decisions. For example, in an air handling unit with two electric heating coils, the fan should be requested on if either coil needs to turn on. This is a logical OR function.

4.3.4 Plant-Level View

This section illustrates how multiple HVAC device components might be interlocked. It illustrates connections to hardware I/O, connections between components for interlock and for sequence regulators, and connections to supply chain.

Figure 8:
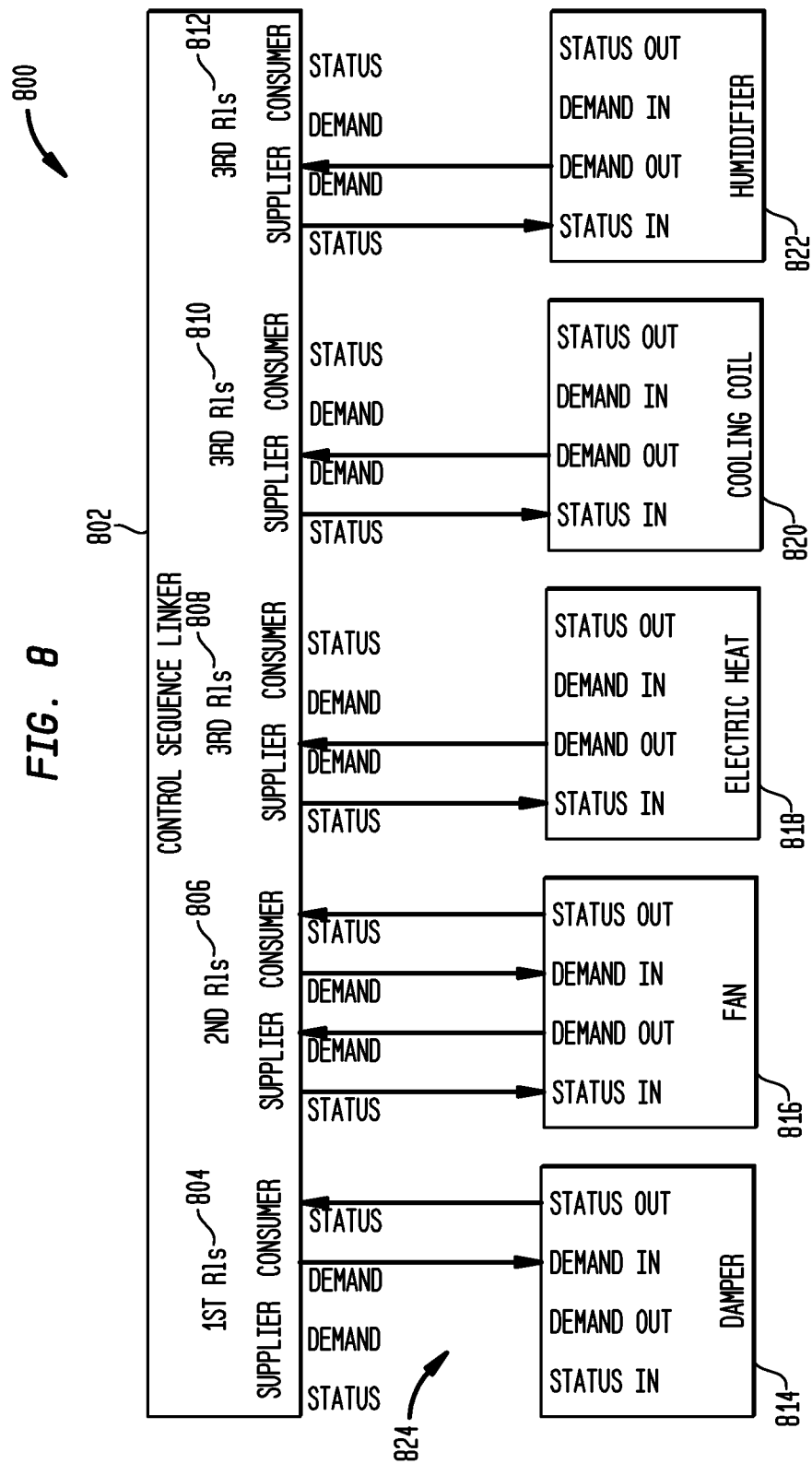
FIG. 8 illustrates a control sequence linker.

FIG. 8 illustrates a control sequence linker embodiment 800. The control sequence linker 802 can be used as the interface for the interlock signals 824 between HVAC device components 814-822. FIG. 8 illustrates a form of the control sequence linker 802, in which it only acts as connection points for the interlock logic inputs (Status In & Demand In) and outputs (Status Out & Demand Out) (collectively 824) of the device components. The control sequence linker 824 connections are identified by the importance of a device component in the interlock sequence. For example, Rls is an abbreviation for Release, and 1st Rls is the importance in the release sequence. Accordingly, as illustrated in the interlock scenario illustrated in FIG. 5, the damper 814 is first (1st) in importance 804 because no air flows unless it is open. The fan 816 is second (2nd) in importance 806, because if the damper 814 is open and the fan 816 is on, then all of the third in importance (3rd) Rls devices 808, 810, 812 can be energized. The electric heat 818 and the cooling coil 820 will then sequence based on the Tseq. By way of example, there could be an Hseq (humidity sequence linker) for the humidifier 822 and the cooling coil 820 (which can act as a dehumidifier if below the dew point temperature of the air).

If a calculation is required in order to implement the interlock function, there are options as to where that calculation will reside as illustrated below.

Figure 9:
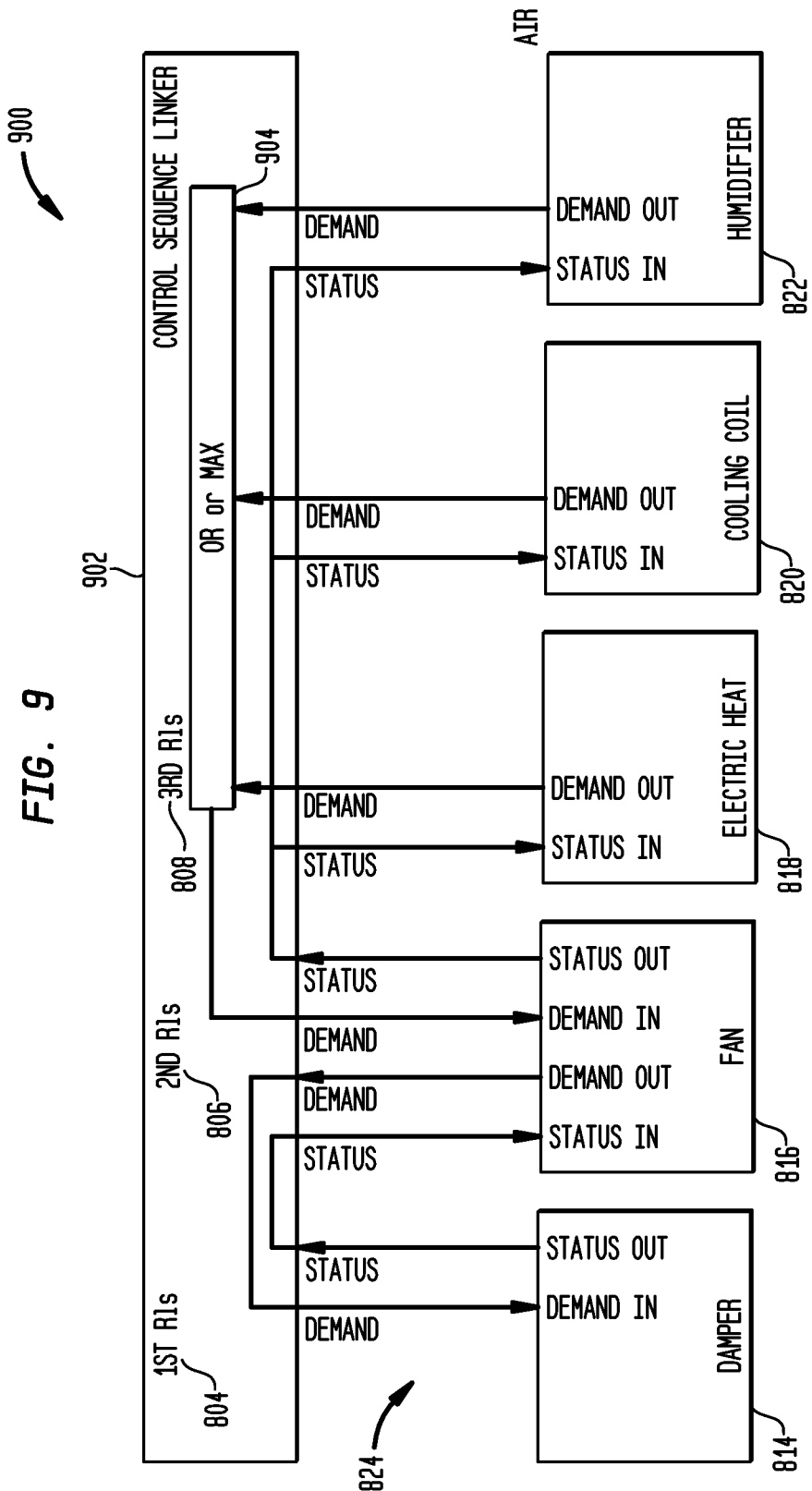
FIG. 9 illustrates an embodiment wherein an OR (or a MAX) statement resides inside of the control sequence linker.

FIG. 9 illustrates an embodiment system 900 wherein an OR (or a MAX) statement 904 resides inside of the control sequence linker 902. One advantage, among many, of this embodiment is that all functionality resides inside of the programming blocks. As is further illustrated in FIG. 9, like FIG. 8, a series of interlock signals 824 is passed between HVAC devices 814-822 and control sequence linker 902 such that that a supported device does not operate without the assistance of its supporting device. Moreover, OR or MAX statement 904 enables control sequence linker 902 to appropriately respond to the demands of one (or more) devices. For example, if both the electric heating coil 818 and humidifier 822 output analog demands, the MAX function in the control sequence linker 902 will take the device having the greater demand value 904, send that to the fan 816. The fan 816 will in turn send a demand to the damper 814. The demand level from the higher of the heating coil 818 or the humidifier 822 can then be used to determine the air flow necessary to meet the air flow and outside air requirements of the heating coil 818 or humidifier 822 demand. The demand signal to the outside air can help provide temperature and humidity control in coordination with a temperature sequence linker (TSeq) and humidity sequence linker (HSeq).

Figure 10:
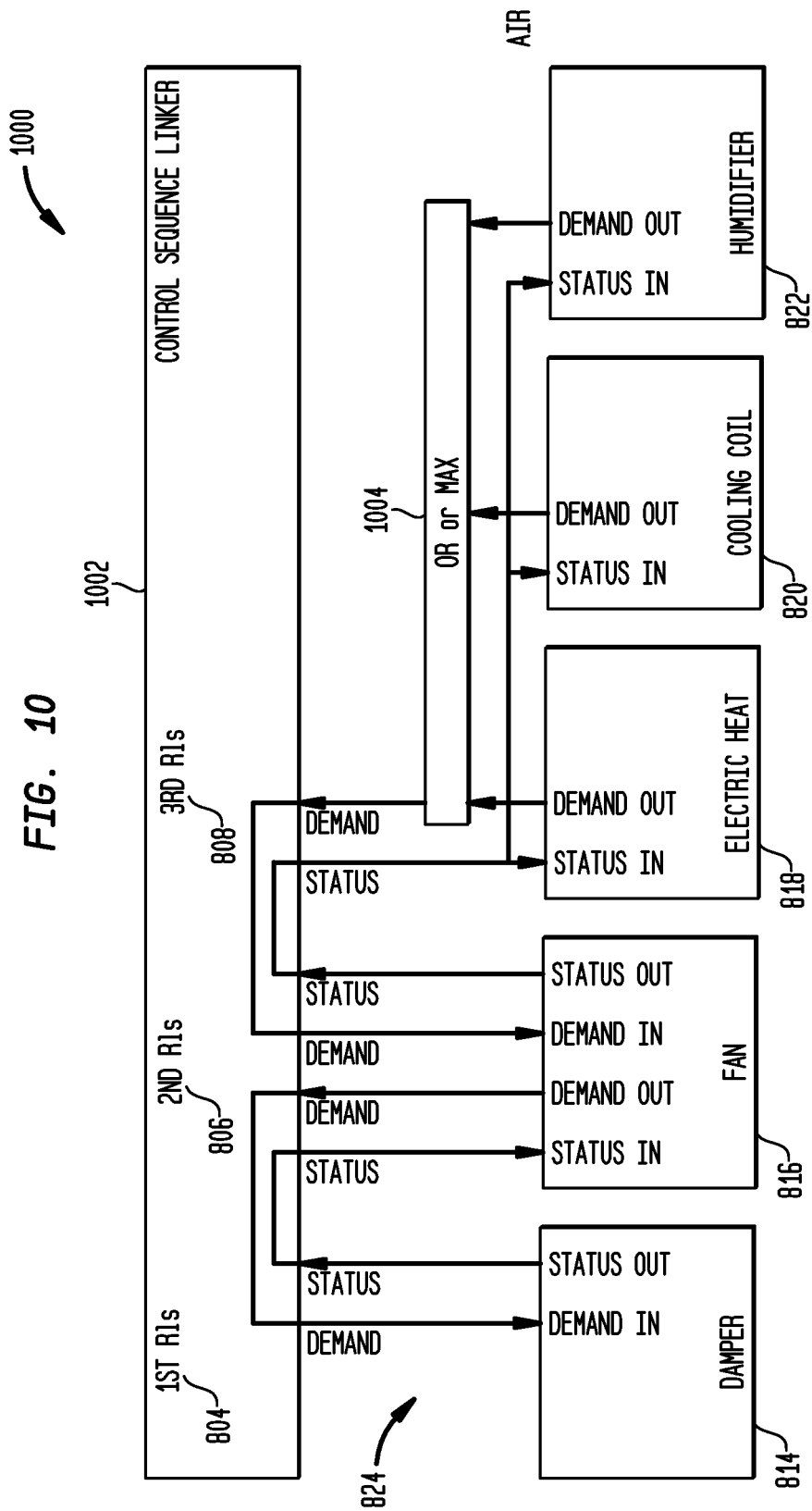
FIG. 10 illustrates another embodiment wherein an OR (or MAX) statement resides outside of the control sequence linker.

FIG. 10 illustrates an embodiment 1000 wherein an OR (or MAX) statement 1004 resides outside of the control sequence linker 1002. Using this embodiment, it is preferred that the software programmer add the Or (or MAX) statement 1004 outside of the programming blocks in one of the software charts. Accordingly, this embodiment requires additional end-user software programmer support as opposed to that illustrated in FIG. 9 which includes the OR or MAX statement 904 to be pre-programmed as a part of control sequence linker 902.

Figure 11:
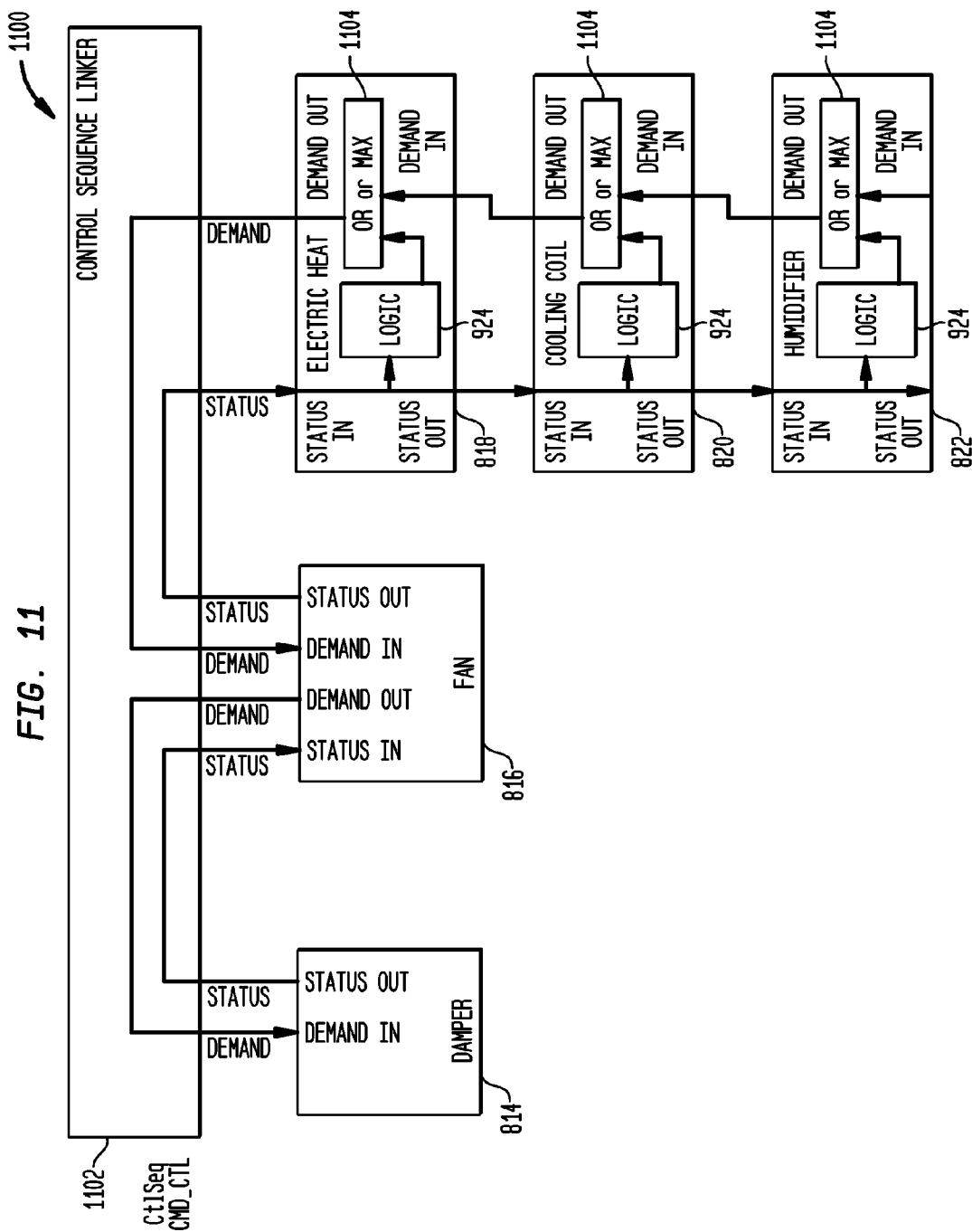
FIG. 11 illustrates another embodiment in which the OR (or MAX) calculation is distributed throughout the multiple HVAC device components.

FIG. 11 illustrates another embodiment 1100 to that illustrated in FIG. 9, wherein the OR (or MAX) calculations 1104 are distributed throughout the multiple HVAC electric heating device components 818-822. One advantage, among many, of this embodiment is that all interlock logic 924 is contained within programming blocks and the control sequence linker 1102 does not have to be designed to accommodate a specific number of heating devices This embodiment has an OR or a MAX block in each coil device component such that they can be interconnected in a "daisy chain" arrangement allowing for accommodation of any number of device components without requiring custom programming but by simply using standard device components because each device component has its incremental amount of OR or MAX logic included within itself.

Figure 12:
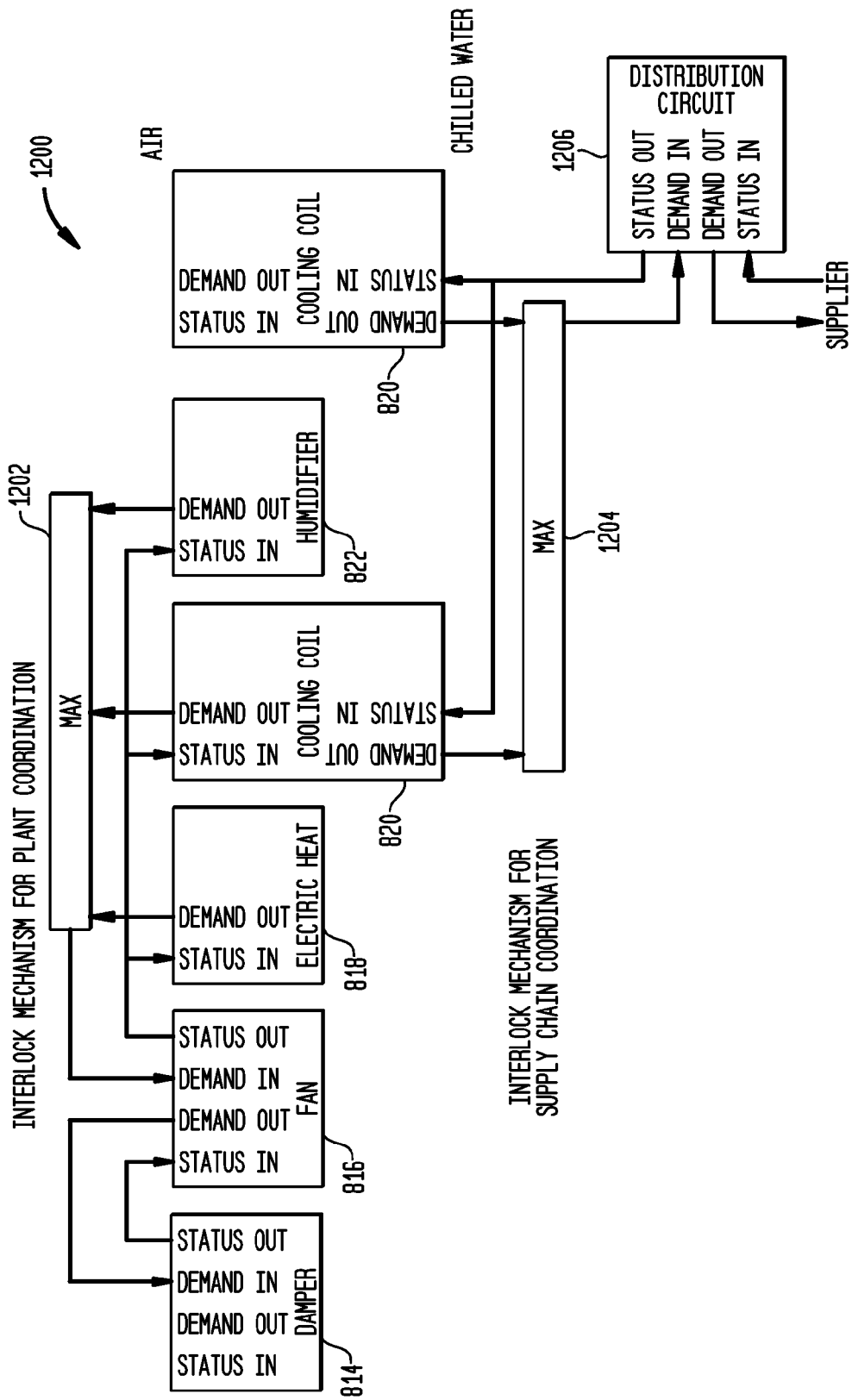
FIG. 12 illustrates a system having the coordination of the interlock mechanism with the supply chain mechanism for a sample plant.

FIG. 12 illustrates a system 1200 having the coordination of the interlock mechanism with the supply chain mechanism for a sample plant. Supply chain logic 1206 has many similarities to interlock logic, as illustrated in FIGS. 2 and 9-11, including the ability to coordinate multiple HVAC devices acting as supporting (supplier) and supported (consumer) devices to other, multiple, HVAC devices also acting as supporting (supplier) and supported (consumer) devices (e.g., 814-820). As is illustrated MAX (or OR) statements 1202, 1204 work similar to those illustrated in FIGS. 9-11, permitting distribution circuit 1206 and multiple HVAC devices 814-822 to coordinate calls such that a supporting (supplier) HVAC device is engaged when needed by a supported (consumer) HVAC device.

4.3.5 Component-Level View

At least 4 different embodiments of HVAC device components are anticipated; additional embodiments are permitted. The following diagrams illustrate the location of the interlock function in each type.

Figure 13:
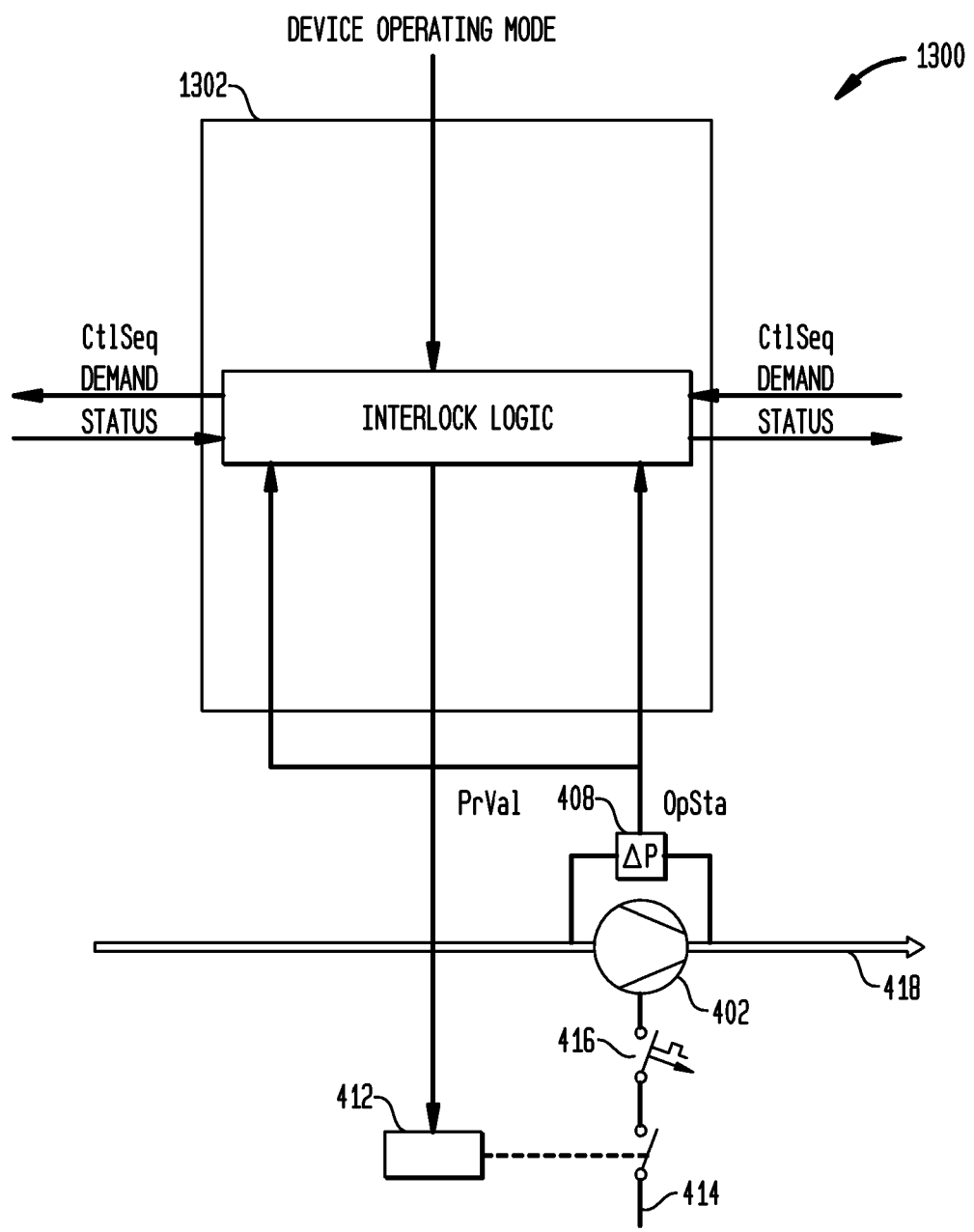
FIG. 13 illustrates a system including an interlock block without a control loop device.

FIG. 13 illustrates system 1300 including an interlock block 1302 without a control loop device.

Figure 14:
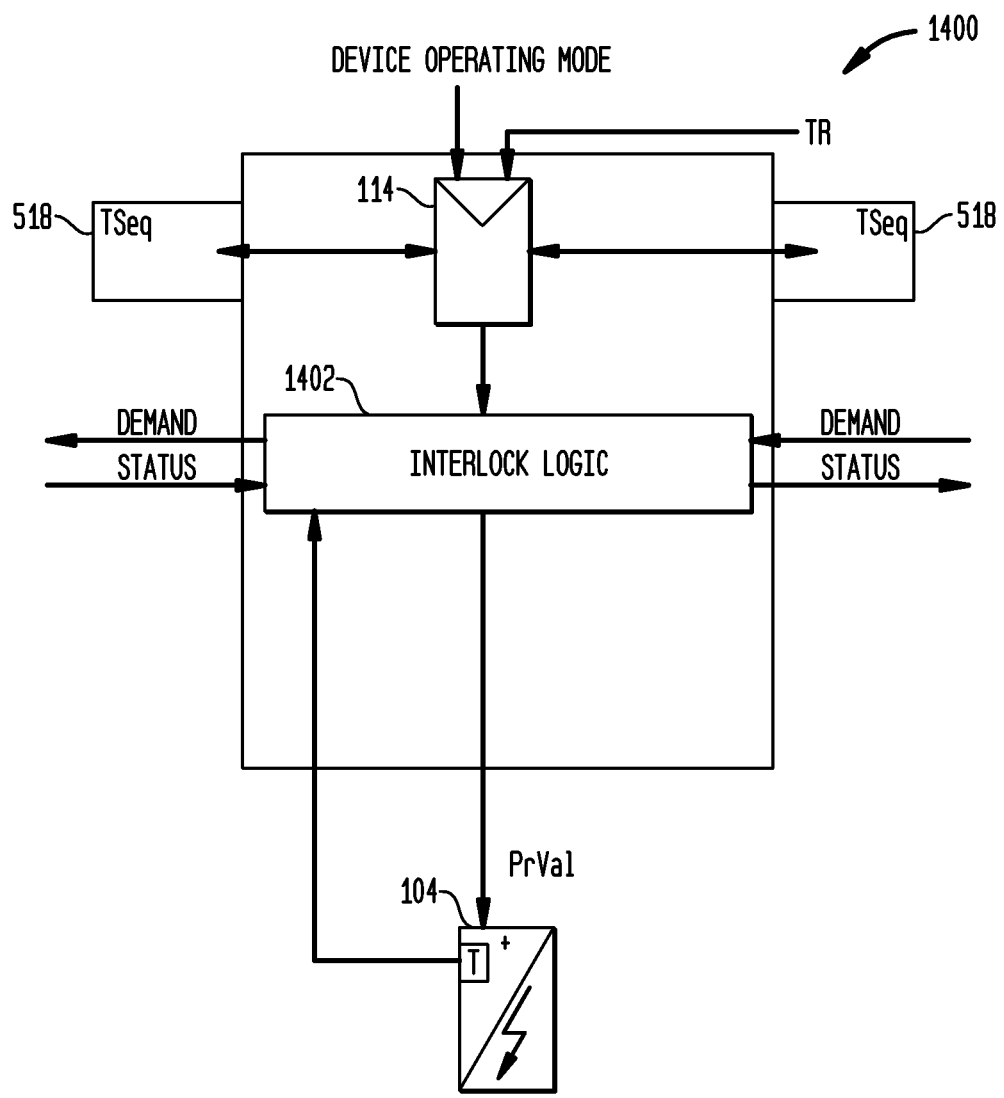
FIG. 14 illustrates a system including an interlock block with a single control loop device.

FIG. 14 illustrates system 1400 including an interlock block 1402 with a single temperature control loop device 114. The operation of the temperature control loop device 114 can sequence with other temperature control loop devices through the temperature sequence linker (TSeq) 518 illustrated.

Figure 15:
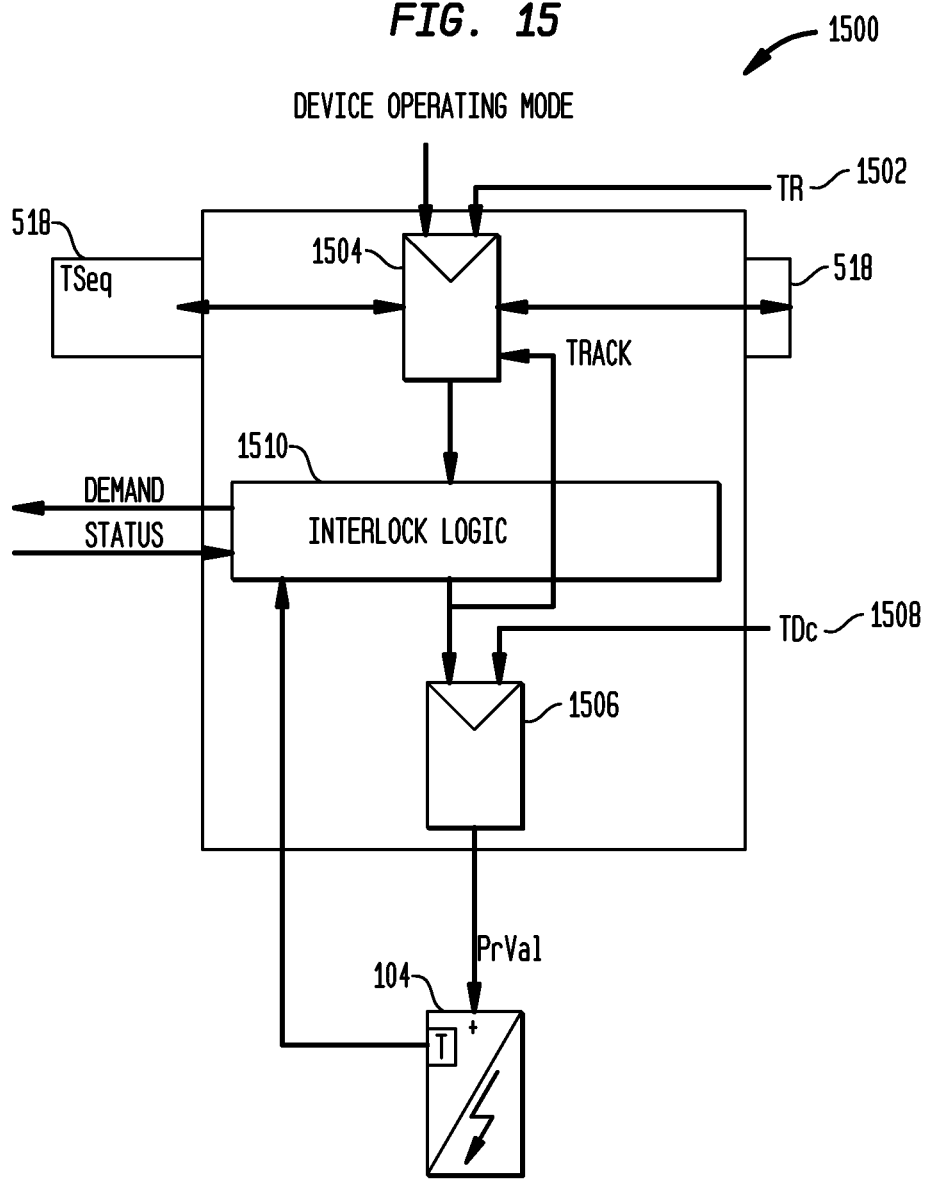
FIG. 15 illustrates system including an interface block with cascaded control loop devices such that one supplies the set point to the other.

FIG. 15 illustrates system 1500 including an interface block with cascaded control loop devices 1504, 1506 such that one supplies the set point to the other. As illustrated in FIG. 15, room temperature TR 1502 comes into controller 1504 which outputs, through the interlock logic, a discharge temperature setpoint to the second controller 1506. Controller 1506 compares this discharge temperature set point against the discharge air temperature TDc 1508 from the heating coil and modulates the electric heat 104 as needed. Thus the demand signal out from the interlock logic 1510 is based on the room temperature demand.

Figure 16:
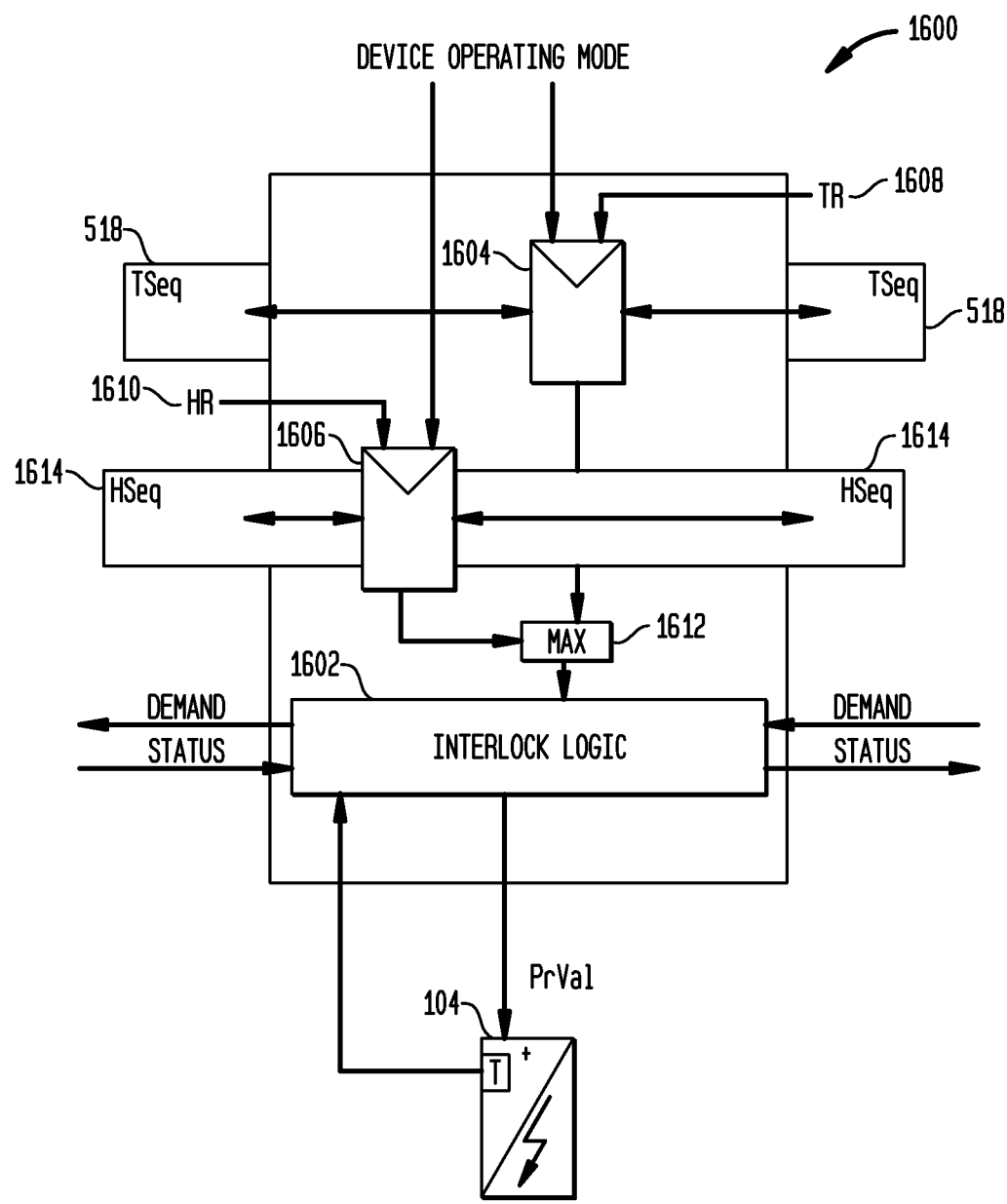
FIG. 16 illustrates a system including an interface block inputted by the larger of two control devices each controlling a separate variable.

FIG. 16 illustrates system 1600 including interlock logic 1602 inputted by the larger of two control devices 1604, 1606, each controlling separate variables. Here, one controller 1604 may sequence with other temperature controllers to maintain temperature TR 1608, and the other controller 1606 may sequence with other humidity controllers to maintain humidity HR 1610 (therein sequencing humidity using humidity sequence linker 1614 similar to sequencing temperature using temperature sequence linker 518), with each value being provided to a coil that affects the humidity. As illustrated in FIG. 16, the larger of the two signals (MAX 1612) is selected and given control of the electric coil 104. Thus, if the humidity is high, the device may increase the temperature to take control of the electric coil 104 to heat the room so as to dry out the room. If the temperature in the room should for some reason get colder, the temperature controller's output signal (configured to act in reverse of the temperature movement of TR 1608) will exceed that of the humidity controller and take over control of the heat to increase the heat even further.

FIG. 17 illustrates a block diagram of a data processing system in which one or more embodiments may be implemented, for example, as an interlock data processing system particularly configured by software or otherwise to perform the processes as described herein and in particular as each one of a plurality of interconnected and communicating systems as described herein. The data processing system depicted includes a processor 1702 connected to a level two cache/bridge 1704, which is connected in turn to a local system bus 1706. Local system bus 1706 may be, for example, a peripheral component interconnect (PCI) architecture bus. Also connected to local system bus 1706 in the illustrated example are a main memory 1708 and a graphics adapter 1710. The graphics adapter 1710 may be connected to display 1711.

Other peripherals, such as local area network (LAN)/Wide Area Network/Wireless (e.g. WiFi) adapter 1712, may also be connected to local system bus 1706. Expansion bus interface 1714 connects local system bus 1706 to input/output (I/O) bus 1716. I/O bus 1716 is connected to keyboard/mouse adapter 1718, disk controller 1720, and I/O adapter 1722. Disk controller 1720 can be connected to a storage 1726, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 1716 in the example illustrated is audio adapter 1724, to which speakers (not shown) may be connected for playing sounds. Keyboard/mouse adapter 1718 provides a connection for a pointing device (not shown), such as a mouse, trackball, trackpointer, etc.

Those of ordinary skill in the art will appreciate that the hardware illustrated in FIG. 17 may vary for particular implementations. For example, other peripheral devices, such as an optical disk drive and the like, also may be used in addition to or in place of the hardware illustrated. The illustrated example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 1712 can be connected to a network 1730 (not a part of data processing system 1700), which can be any public or private data processing system network or combination of networks, as known to those of skill in the art, including the Internet. Data processing system 1700 can communicate over network 1730 with server system 1740, which is also not part of data processing system 1700, but can be implemented, for example, as a separate data processing system 1700.

The methods, processes, and systems illustrated herein and equivalents thereto provide numerous benefits including but not limited to, the efficient installation and implementation of HVAC interlocks to prevent system errors or damage due to one or more HVAC devices running/not running in support of another, the efficient installation and implementation of HVAC supply chain logic to communicate the need for resources to be provided by a supplier for a consumer to accomplish its goal of conditioning the environment of a building or other facility Numerous other benefits exist.

Those of skill in the art will appreciate that embodiments not expressly illustrated herein may be practiced within the scope of the present discovery, including that features described herein for different embodiments may be combined with each other and/or with currently-known or future-developed technologies while remaining within the scope of the claims presented here. It is therefore intended that the foregoing detailed description be regarded as illustrative rather than limiting. It is understood that the following claims, including all equivalents, are intended to define the spirit and scope of this discovery. Furthermore, the advantages described above are not necessarily the only advantages of the discovery, and it is not necessarily expected that all of the described advantages will be achieved with every embodiment of the discovery.

What is claimed is:

1. A method for applying interlock assurances for a plurality of building automation devices, the method comprising:
   providing a plurality of interlock blocks as parts of a respective plurality of building automation devices, a first interlock block of the plurality of interlock blocks being in a supported building automation device of the plurality of the building automation devices, the first interlock block logically connected to the supported building automation device and second interlock block of the plurality of interlock blocks being in a supporting building automation device of the plurality of building automation devices, wherein each of the interlock blocks of the plurality has a same arrangement of parts and corresponding interlock function that is capable of use in any of the building automation devices of the plurality, the parts including inputs and outputs for communicating between the interlock blocks, the parts of each of the interlock functions selected based on the respective building automation device in which the interlock block is located;
   wherein the first interlock block comprises;
      an input status module for receiving an input from the second interlock block of the supporting building automation device;
      an output status module for sending an output to the supported building automation devices; and
      means for determining whether the supporting building automation device is configured to support the supported building automation device;
   receiving, by the first interlock block, a demand request from the supported building automation device; and
   determining, by the first interlock block, whether the supporting building automation device is configured to support the supported building automation device, the determining being based on the input from the second interlock block.

2. The method of claim 1, further comprising sending a signal to the supported building automation device that the supporting building automation device is presently in a state in which the supporting building automation device can support the supported building automation device.

3. The method of claim 2, further comprising configuring the supported building automation device to engage.

4. The method of claim 1, further comprising sending a signal to the supported building automation device that the supporting building automation device is presently not in a state in which the supporting building automation device can support the supported building automation device.

5. The method of claim 4, further comprising configuring the supported building automation device to disengage.

6. The method of claim 1, further comprising communicating a priority with the demand request for the supported building automation device, different ones of the building automation devices having different priorities such that the supporting and supported building automation devices are protected from damage caused by commands of lower priority from outside an interlock structure.

7. The method of claim 1, further comprising providing a third interlock block of the plurality of interlock blocks logically connected to a second supporting building automation device supporting the supported building automation device, wherein the third interlock block is logically connected to the first interlock block.

8. The method of claim 1, wherein the supported building automation device comprises a fan and the supporting building automation device comprise a damper or a heating coil.

9. A system for assuring that a supported building automation device has adequate support from a supporting building automation device, the system comprising:
a plurality of interlock blocks of a plurality of building automation devices, the plurality of interlock blocks including first and second interlock blocks, a first interlock block logically connected to the supported building automation device and the second interlock block of a supporting building automation device, wherein the interlock blocks of the plurality each comprise:
a device input status module for receiving one or more inputs from one or more building automation devices;
a device output status module for sending outputs to one or more building automation devices;
supplier demand out and supplier status in modules for communicating with one of the interlock blocks, the building automation device of the one of the interlock blocks being a supplier;
consumer demand in and status out models for communicating with a another one of the interlock blocks, the building automation device of the other one of the interlock blocks being a consumer; and
means for determining whether the supplier building automation device is configured to support the consumer building automation device.

10. The system of claim 9, further comprising configuring the supported building automation device to properly react to a received signal indicating that the supporting building automation device is configured to support the supported building automation device.

11. The system of claim 9, wherein the supporting building automation device comprises a damper.

12. The system of claim 9, further comprising a control sequence linker for linking the communicating between the interlock blocks of the supplier demand out, supplier status in, consumer demand in, and/or the consumer status out models.

13. The system of claim 9, further comprising a temperature sequence linker logically connected to the first interlock block, wherein the temperature sequence linker includes a temperature controller for a heating coil.

14. The system of claim 9, wherein the first interlock block is configured for supply chain coordination.

15. The system of claim 9, wherein the first interlock block is configured outside a control loop device.

16. The system of claim 9, wherein the first interlock block is configured to communicate with cascaded control loop devices.

17. The system of claim 9, wherein the first interlock block is configured with control loop devices of two or more control variables.

18. In a non-transitory computer readable storage medium having stored therein data representing instructions executable by a programmed processor for controlling a supported building automation device, the storage medium comprising instructions for:
providing a first interlock block logically connected to the supported building automation device and a second interlock block of a supporting building automation device of the supported building automation device, the first and second interlock blocks each comprising:
an input status module for receiving inputs from a first building automation device;
an output status module for sending outputs to a second building automation device; and
a module for determining from another interlock block whether support is available;
receiving a demand request from the supported building automation device; and
determining whether the supporting building automation device is presently configured to support the supported building automation device.

19. The non-transitory computer readable storage medium of claim 18, further comprising instructions for linking communications between the first and second interlock blocks.

20. The non-transitory computer readable storage medium of claim 18, further comprising instructions for determining a priority level of the supported building automation device, different building automation devices having different priorities.

* * * * *